(12) United States Patent
Schwager

(10) Patent No.: US 7,013,339 B2
(45) Date of Patent: Mar. 14, 2006

(54) METHOD TO CONTROL A NETWORK DEVICE IN A NETWORK COMPRISING SEVERAL DEVICES

(75) Inventor: Andreas Schwager, Kernen (DE)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 912 days.

(21) Appl. No.: 09/754,152

(22) Filed: Jan. 4, 2001

(65) Prior Publication Data

US 2002/0029271 A1 Mar. 7, 2002

Related U.S. Application Data

(63) Continuation of application No. PCT/EP99/04538, filed on Jul. 1, 1999.

(60) Provisional application No. 60/091,812, filed on Jul. 6, 1998.

(30) Foreign Application Priority Data

| Jul. 6, 1998 | (EP) | ................................. 98112499 |
| Jul. 6, 1998 | (EP) | ................................. 98112500 |
| Jul. 6, 1998 | (EP) | ................................. 98112501 |

(51) Int. Cl.
    *G06F 15/173* (2006.01)
(52) U.S. Cl. .................... 709/226; 709/229; 709/210; 710/241; 710/244; 340/825.5
(58) Field of Classification Search ................ 700/2–4, 700/9, 20, 79, 82; 709/208, 210, 223, 225, 709/226, 229; 710/240–242, 244, 36, 37, 710/40, 39; 340/3.1, 3.9, 825.5
See application file for complete search history.

(56) References Cited

U.S. PATENT DOCUMENTS

| 4,380,798 | A | * | 4/1983 | Shannon et al. ............ 710/241 |
| 5,289,461 | A | * | 2/1994 | de Nijs ...................... 370/360 |
| 5,572,517 | A | * | 11/1996 | Safadi ........................ 370/431 |
| 5,966,372 | A | * | 10/1999 | Wright et al. ............... 370/329 |
| 6,092,133 | A | * | 7/2000 | Erola et al. ................. 710/301 |
| 6,199,133 | B1 | * | 3/2001 | Schnell ...................... 710/110 |

(Continued)

FOREIGN PATENT DOCUMENTS

EP 0457673 5/1991

(Continued)

OTHER PUBLICATIONS

Grunding, Hitachi, Matsushita, Philips, Sharp, Sony, Thompson, and Toshiba "The HAVi Architecture, Version 0.8" May 15, 1998, XP002089719, p. 6-p. 18.

*Primary Examiner*—Anthony Knight
*Assistant Examiner*—Crystal J. Barnes
(74) *Attorney, Agent, or Firm*—Gregory J. Koerner; Redwood Patent Law

(57) ABSTRACT

A method to control a network device in a network comprising several devices includes a first controller that operates to prevent another controller from performing an unwanted overtaking of a network device that is currently controlled by the first controller. In one embodiment, the first controller has the ability to reserve a controllable network device to thereby become its primary controller, so that the first controller may maintain control over the controllable network device against control demands of other controllers present in the network.

18 Claims, 14 Drawing Sheets

U.S. PATENT DOCUMENTS

| | | | |
|---|---|---|---|
| 6,237,049 B1 * | 5/2001 | Ludtke | 710/8 |
| 6,252,886 B1 * | 6/2001 | Schwager et al. | 370/443 |
| 6,272,386 B1 * | 8/2001 | McLaughlin et al. | 700/82 |
| 6,292,905 B1 * | 9/2001 | Wallach et al. | 714/4 |
| 6,654,821 B1 * | 11/2003 | Aikawa et al. | 710/36 |
| 6,704,819 B1 * | 3/2004 | Chrysanthakopoulos | 710/240 |

FOREIGN PATENT DOCUMENTS

| | | | |
|---|---|---|---|
| JP | 08055080 A | * | 2/1996 |
| JP | 11195008 A | * | 7/1999 |
| WO | 9817033 | | 4/1998 |

* cited by examiner

METHOD TO CONTROL A NETWORK DEVICE IN A NETWORK COMPRISING SEVERAL DEVICES

CROSS-REFERENCE TO RELATED APPLICATIONS

This application claims priority in, and relates to the following patent applications: U.S. Provisional Patent Application No. 60/091,812, entitled "Bandwidth Reservation," filed on Jul. 6, 1998, European Patent Application No.98 112 500.8, entitled "Bandwidth Reservation," filed on Jul. 6, 1998, European Patent Application No.98 112 499.3, entitled "Method To Control A Network Device In A Network Comprising Several Devices," filed on Jul. 6, 1998, European Patent Application No.98 112 501.6, entitled "Method To Perform A Scheduled Action Of Network Devices," filed on Jul. 6, 1998, and is a continuation of PCT Patent Application No. PCT/EP99/04538, entitled "Method To Control A Network Device In A Network Comprising Several Devices," filed on Jul. 1, 1999.

Furthermore, this application also relates to U.S. patent application Ser. No. 09/346,251, entitled "Bandwidth Reservation," filed on Jul. 1, 1999, to co-pending PCT Patent Application No. PCT/US99/15369, entitled "Bandwidth Reservation," filed on Jul. 1, 1999, and to co-pending PCT Patent Application No. PCT/EP99/04537, entitled "Method To Perform A Scheduled Action Of Network Devices," filed on Jul. 1, 1999.

BACKGROUND OF THE INVENTION

1. Field of the Invention

This invention relates generally to techniques for implementing electronic networks, and relates more particularly to a method for controlling a network device in a network comprising several devices.

2. Description of the Background Art

Implementing an effective method for managing electronic devices within an electronic network is a significant consideration for manufacturers and designers of contemporary electronic systems. An electronic device in a distributed electronic network may advantageously cooperate with other electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing a network of electronic devices may create substantial challenges for designers of electronic networks. For example, enhanced demands for increased functionality and performance may require more system processing power and require additional hardware resources across the network. An increase in processing or hardware requirements may also result in a corresponding detrimental economic impact due to increased production costs and operational inefficiencies.

Network size is also a factor that affects the management of devices in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to cooperate with various remote software elements on remote devices across the electronic network. However, successfully managing a substantial number of electronic devices across a single network may provide significant benefits to a system user.

Furthermore, enhanced device capability to perform various advanced functions may provide additional benefits to a system user, but may also place increased demands on the control and management of the various devices in the electronic network. For example, an enhanced electronic network that effectively accesses, processes, and displays digital television programming may benefit from efficient network communication techniques because of the large amount and complexity of the digital data involved.

Therefore, for all the foregoing reasons, implementing an efficient method for managing electronic devices in a distributed electronic network remains a significant consideration for designers, manufacturers, and users of contemporary electronic systems.

SUMMARY OF THE INVENTION

In accordance with the present invention, a method is disclosed to control a network device in a network comprising several devices. In one embodiment, the invention preferably comprises a reliable method to control a controllable device with a control device in a network comprising several control devices. According to the present invention, it should be ensured that a control device accessing a controllable device, i.e. controlling this controllable device, cannot simply be overruled by another control device. The present invention includes a first control device that is able to reserve the controllable device as a primary controller so that a second control device or a further control device cannot overrule the controls of the first control device with their control commands.

According to this present invention it is not possible for a control device to influence a controllable device with its control command after another control device has reserved the controllable device. However, in a preferred embodiment of the present invention, it is possible that a reservation of a control device can be pre-empted by another control device. Pre-emption in this context means that the reservation of a control device is cancelled and the pre-empting control device obtains the reservation itself.

In one embodiment, a first controller operates to prevent another controller from performing an unwanted overtaking of a network device that is currently controlled by the first controller. The first controller has the ability to reserve a controllable network device to thereby become its primary controller which then cannot simply be overruled by control demands of other controllers present in the network. The present invention thus efficiently and effectively controls a network device in a network comprising several devices.

BRIEF DESCRIPTION OF THE DRAWINGS

The present invention and further aspects, features and advantages will be better understood from the detailed description of exemplary advantageous embodiments thereof taken in conjunction with the accompanying drawings. In all the drawings, the same reference signs denote the same or similar devices.

DETAILED DESCRIPTION OF THE PREFERRED EMBODIMENT

Figure 1:
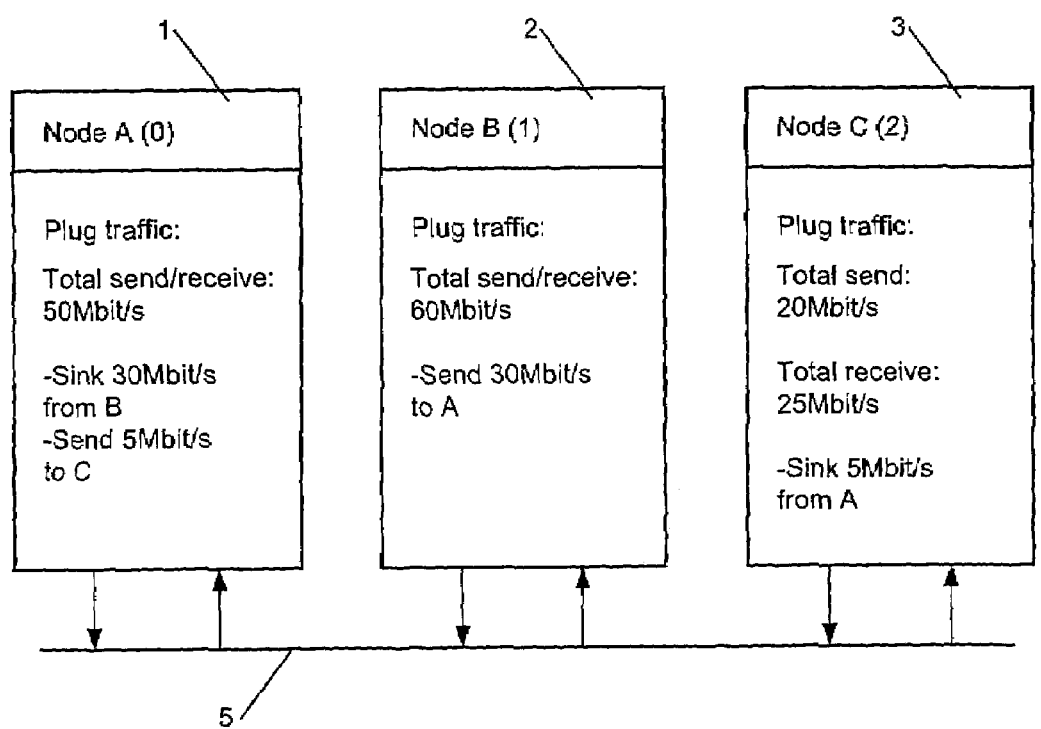
FIG. 1 is a diagram for an example of plug traffic lists of network nodes, in accordance with one embodiment of the present invention.

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

In certain embodiments, the present invention may operate in conjunction with a network that is preferably implemented using a P1394 Standard for a High Performance Serial Bus, IEEE, 1995, which is hereby incorporated by reference. Similarly, the present invention may also function together with a network that preferably operates in accordance with the Home Audio/Video Interoperability (HAVi) core specification, version 0.8, which is also hereby incorporated by reference. However, in alternate embodiments, the present invention may readily function using various other network interconnectivity and interoperability techniques which are equally within the scope of the present invention.

Bandwidth Reservation

One aspect of the present invention concerns a method to reserve bandwidth for a connection of at least two nodes connected to each other via a radio network or a wired network, especially a network comprising a resource manager, e.g. the isochronous resource manager of an IEEE 1394 network. Generally, networks like IEEE 1394-based home networks offer a limited amount of bandwidth to all connected communication devices. Bandwidth is a global resource in the network. If one device allocates a certain amount of bandwidth, another device cannot use this bandwidth. Intelligent networks have a mechanism to allocate and release bandwidth via a resource manager. This resource manager handles all requests and releases of bandwidth allocation in the network.

However, a home network like the IEEE 1394-based network or a network described in IEC 61883 have various possibilities regarding different transmission speeds and/or capacities of the bus itself and the connected devices. It is possible that one device needs more bandwidth than is available on the network and that bandwidth has to be transferred from one device to another. Furthermore, it is easily possible that the resource manager overloads a plug, i.e. a device connected to the network, when only observing the available bandwidth on the network.

Therefore, one aspect of the present invention provides a method for bandwidth management on a network and on the connection plugs of all devices to prevent overload of the network and of the devices connected thereto. The present invention to reserve bandwidth for a communication of at least two nodes connected to each other via a network comprising a resource manager wherein a node, preparing a new connection starts a request for whether each of the nodes that are planned to participate at the new connection has enough resources to participate at said new connection, and requests the needed network bandwidth with the resource manager.

According to this present invention, every plug has to check if the received bandwidth overloads the device or not, and the network bandwidth for the bus is requested. The various transmission speeds on the bus and the various data rates a node connected to the bus is able to sink or send maximal with the transmission speed of the node are respectively handled by a management system that has an easy access to the needed information. So every plug, e.g. node, connected to the bus and planned to participate at a new connection knows its possibilities to sink or send various data rates maximal with its possible transmission speed and knows its remaining capacity.

On the other hand, the resource manager is able to decide if a certain connection on the bus itself is possible or not. With first registering a planned new connection at each plug that is planned to participate, the resource manager is held free of unnecessary registration traffic for the case that the network has enough capacity to allow a new communication, but at least one of the nodes participating is fully loaded, i.e. can not handle the planned new connection any more. On the other hand, when the requests are performed vice versa, registering of the needed bandwidth at each plug can be omitted when the network bandwidth for the new connection requested with the recource manager is not available.

According to the present invention, the plug traffic of every node may be registered so that it can be checked during the preparation of a new connection. In the shown embodiment, every plug stores the information it needs to identify a communication itself. The numbers shown in this example represent the bandwidth that is used by a communication or is free on the bus, e. g. 50 Mbit/s.

The following data has to be stored at/for every node:

the total ability to sink or/and receive, the outgoing communications, and the incoming communications.

Therefore, it is possible for every plug, i.e. node or device, to check whether an additional communication is possible or not.

Referring now to FIG. 1, a diagram for an example of plug traffic lists for two communications is shown, in accordance with one embodiment of the present invention. In the FIG. 1 embodiment, a node A 1, a node B 2, and a node C 3 are connected to a bus system 5. In the shown example of FIG. 1, every node stores its own plug traffic list.

Node A 1 has a total send/receive capacity of 50 megabits per second (Mbit/s) and has registered that it sinks 30 Mbit/s from node B 2 and sends 5 Mbit/s to node C 3. Node B 2 has a total send/receive capacity of 60 Mbit/s and has registered that it sends 30 Mbit/s to node A 1. Node C 3 has a total send capacity of 20 Mbit/s and a total receive capacity of 25 Mbit/s and has registered that it sinks 5 Mbit/s from node A 1.

Therefore, it can be seen that for nodes A 1 and B 2, it does not matter whether they send or receive as long as the bandwidth needed to send and/or to receive is within their respective capacities, whereas node C 3 is restricted to certain data rates respectively for sending and receiving. Furthermore, a first communication can be identified from node B 2 to node A 1 with a data rate of 30 Mbit/s, and a second communication can be identified with a data rate of 5 Mbit/s from node A 1 to node C 3.

Therefore, every node can determine whether it can handle an additional communication or not. For example, node A 1 has a total load of 35 Mbit/s and therefore a rest capacity of 50 Mbit/s−35 Mbit/s=15 Mbit/s. For node B 2, it is possible to send and/or receive a total of an additional 30 Mbit/s, and for node C 3 it is possible to receive an additional 25 Mbit/s and to send an additional 20 Mbit/s. It is also possible that not every node stores its plug traffic list itself as long as a plug traffic list of every node exists, gets actualized, and can be accessed by the respective node and/or a node that is setting-up a new communication.

With only the knowledge of the capabilities of the single nodes, it is can not be determined if a new communication is possible. Whether the bus connecting the various nodes can handle the additional traffic also has to be checked. Therefore, the resource manager handling the allocation of bandwidth at the bus has to have access to a bus traffic list showing how the bus is loaded with the various transmission speeds in order to determine whether an additional communication on the bus will be possible.

The bus traffic list can be available on the network at only one location, e. g. within the resource manager or a certain node, or it can be stored at every node. In the case that the bus traffic list is stored only once by one device within the network, it has to be ensured that the bus traffic list will be transferred to another device in the event that the device storing the unique bus traffic list is switched-off. This has also to be taken into account when storing the plug traffic lists of all nodes centralized in only one device within the network. In case the bus traffic list is stored more than once within the network, it has to be ensured that every stored list has the same entries, i.e. the lists will be updated.

Figure 2:
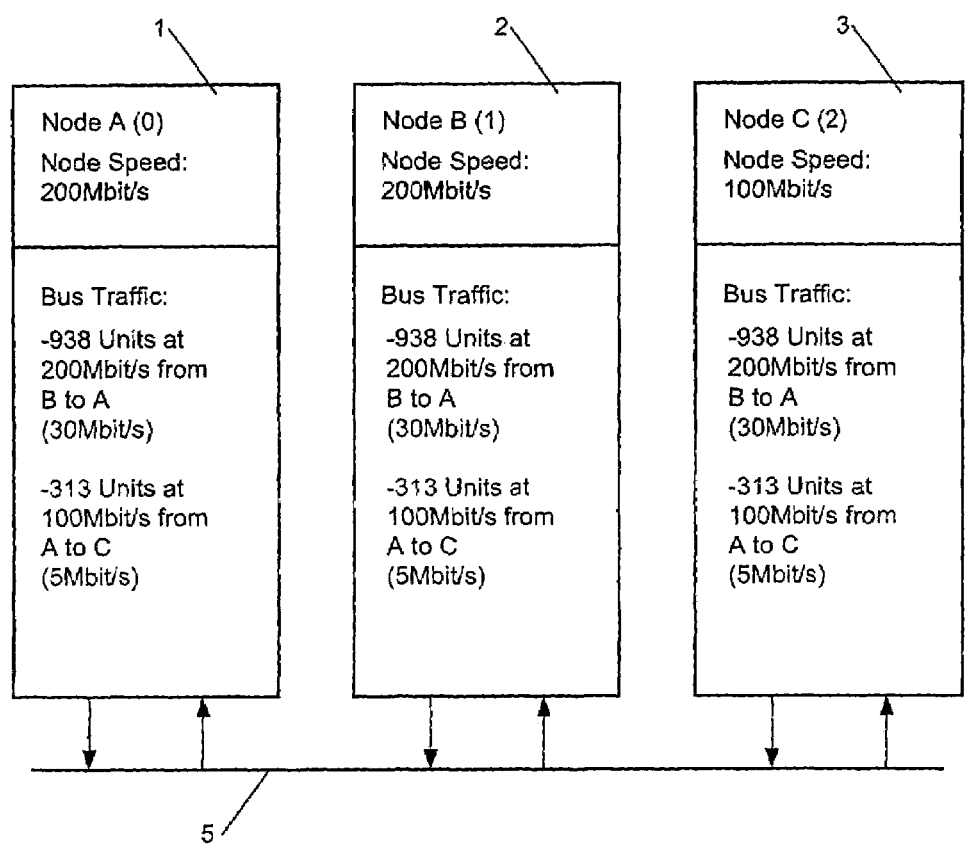
FIG. 2 is a diagram for an example of the bus traffic list(s) of a network, in accordance with one embodiment of the present invention.

Referring now to FIG. 2, a diagram for an example of the bus traffic list(s) of a network is shown, in accordance with one embodiment of the present invention. In the FIG. 2 example, the bus traffic list is stored in every node. The entries in the shown example are the bandwidth allocation units and the communication speed on an IEEE 1394 bus. If an application wants to calculate the used bandwidth of a communication it may use the following equation:

$$((Units \times 20\ Ns)/125000\ Ns)) \times Speed = Bandwidth$$

For example, $((938\ units \times 20\ Ns)/125000\ Ns)) \times 200\ Mbit/s = 30\ Mbit/s$, since one time frame of the IEEE 1394 bus has a length of 125000 Ns, and is divided into 6144 units of 20 Ns, each transmitting 2 bits at a speed of 100 Mbit/s.

In the shown example, every node watches the bus traffic. Therefore every node is able to check whether an additional communication is possible on the bus. The three nodes that are also shown in FIG. 1 store, besides the plug traffic lists as shown in FIG. 1, their respective node speed and the bus traffic list. Every node also has a unique node number within the network that is automatically assigned, e.g. by the resource manager. Node A 1 has a node speed to send and/or receive data of 200 Mbit/s, node B 2 has also a node speed to send/receive data of 200 Mbit/s and node C 3 has a node speed to send/receive data of 100 Mbit/s.

The bus traffic list stored in every node in the shown example has two entries, namely that of the first communication showing that 938 units are sent every time frame at 200 Mbit/s from node B 2 to node A 1, i. e. a communication having a bandwidth of 30 Mbit/s, and the second communication needing 313 units every time frame that at a transmission speed of 100 Mbit/s from node A 1 to node C 3, namely a communication having a bandwidth of 5 Mbit/s. By observing both those foregoing lists, it is possible for every node to determine whether an additional communication within the network is possible.

Figure 3:
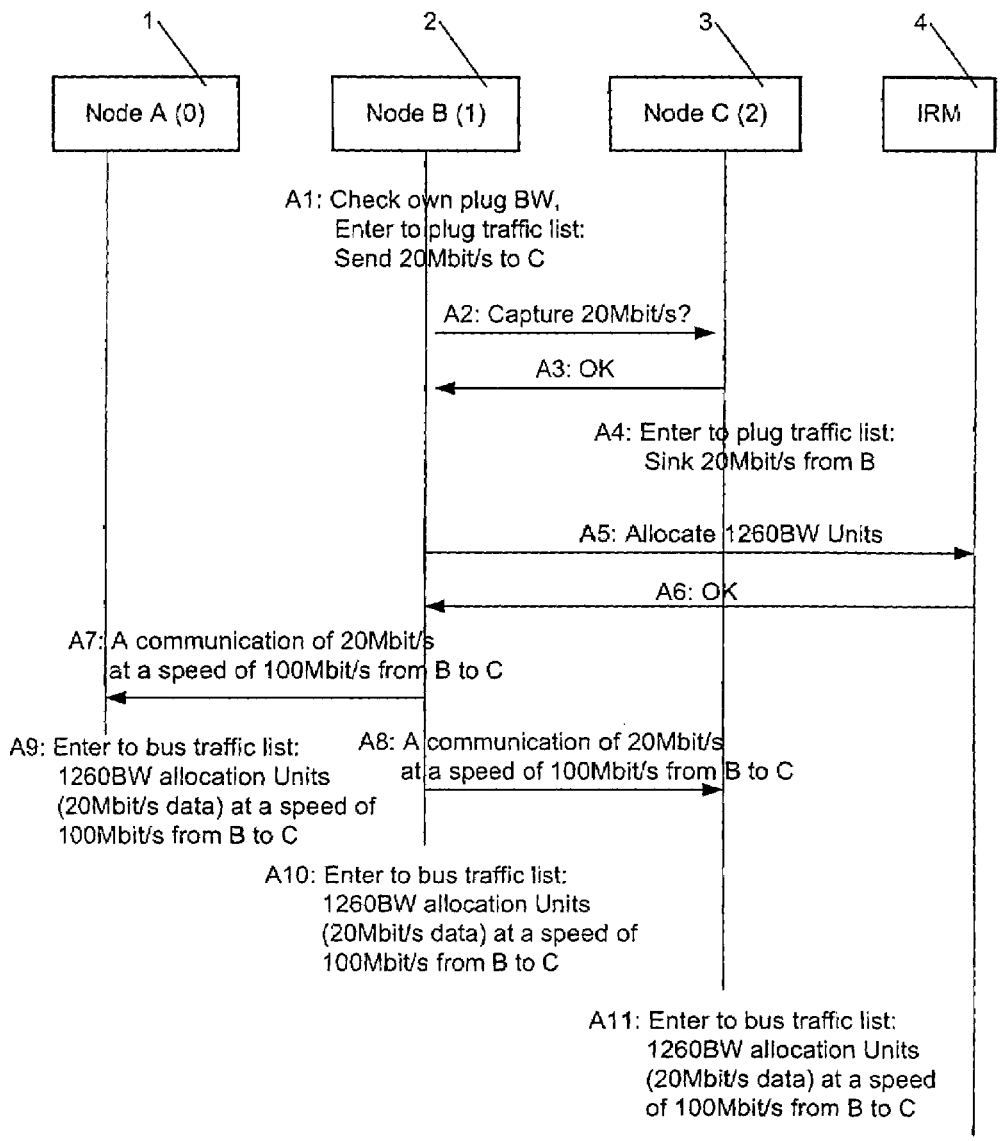
FIG. 3 is a diagram for an example of the setting-up of a new connection within the network, in accordance with one embodiment of the present invention.

Referring now to FIG. 3, a diagram for an example of the setting-up of a new connection within the network is shown, in accordance with one embodiment of the present invention. FIG. 3 shows an example of the bandwidth allocation for a new communication. In the shown example, node B 2 seeks to set up a third communication to send data with a bandwidth of 20 Mbit/s at a speed of 100 Mbit/s to node C 3.

First, all nodes that are planned to participate in the new communication have to be checked for whether they have enough capacity for this planned new communication or not. Since, in the shown embodiment, all nodes store their own plug traffic lists, all plugs involved in the communication have to be asked whether or not the additional bandwidth is possible for them to handle. To avoid deadlock problems, namely when two nodes want to reserve bandwidth at the same time, the nodes have to be asked in a predetermined order, e. g. in the order of the respective node numbers.

As mentioned above, a bus node number is unique number for a node connected to the network, and is assigned to the node by the resource manager. In the shown example, the node A 1 has the bus node number 0, the node B 2 has the bus node number 1, and the node C 3 has the bus node number 2. Under the assumption that n nodes are present in the network, the predetermined order of sending requests from one node to the others according to this example is first node 0 if involved, than node 1 if involved, . . . until at last node n−1. The available plug traffic bandwidth of the own node, i. e. the requesting node, will also be checked in the order of the node numbers, neither first nor last (only if the own number is the lowest or highest node number of all involved nodes).

A deadlock in this context means that two nodes are requesting and reserving bandwidth of other nodes at the same time, and it is then not possible to properly set up both connections, since the total system does not have enough capacity. In this case, it is also not possible to set up at least one connection for these two nodes within the system capacity, since both devices are blocking each other with their "synchronized" requests. Such a deadlock would happen, for example, if node A 1 would first reserve its own bandwidth, e.g. to send picture data to node B 2, and then becomes fully loaded, and, at the same time, node B 2 would reserve its own bandwidth, e.g. to send audio data to node A 1, and then becomes fully loaded. Then, when either of the nodes A 1 or B 2 requests bandwidth for its planned communication, the respective other node will refuse.

If a plug agrees to the communication, then it has to enter the communication onto its plug traffic list. Entering the communication means to enter whether to sink or to send the requested data rate. In case the plug traffic list is stored in another device than the node itself, it is self-evident that the node itself that is planned to participate in the new communication need not necessarily be involved in the checking procedure as to whether an additional reservation of bandwidth is possible, and need not necessarily update its corresponding plug traffic list itself.

FIG. 3 shows the network of preceding FIGS. 1 and 2. In the example shown in FIG. 3, node B 2 wants to prepare a new communication to send data with a bandwidth of 20 Mbit/s at a speed of 100 Mbit/s to node C 3. Therefore, the involved nodes for this new communication are node B 2 having the node number 1, and node C 3 having the node number 2. In step A1, the predetermined order defines that node B 2 has first to check its own plug traffic list for the needed bandwidth, since its node number 1 is lower than node number 2 of node C 3 which is the only other node involved in this case. Since node B 2 has a rest capacity of 30 Mbit/s (see FIG. 1), it has enough capacity for the planned new communication and can make a new entry to its plug traffic list, namely, "send 20 Mbit/s to node C 3." Furthermore, node B 2 sends a request to node C 3 for whether node C 3 has enough capacity to handle the planned new communication or not. Therefore, in step A2, it requests whether it is possible to capture a communication with 20 Mbit/s to node C 3. Since node C 3 has a rest capacity to receive 20 Mbit/s (see FIG. 1), it sends a positive message to node B 2 in step A3, and enters this new communication onto its plug traffic list in step A4, namely, "sink 20 Mbit/s from node B 2."

If all involved plugs are able to handle the new communication, the bandwidth on the bus has to be allocated at the resource manager 4, e.g. the isochronous resource manager of the IEEE 1394 home network. At bandwidth allocation, there are no deadlock problems possible, since there is only one device deciding if the load of the bus traffic allows an additional communication, namely the isochronous resource manager 4. In case the bus traffic list is stored in every node, a node that receives a positive message from the resource manager 4 has to inform all other nodes present in the network of the new communication. Every node that receives this information has to enter the communication to its bus traffic list. This information procedure can be done in an arbitrary order. As mentioned above, the other solution, to implement the bus traffic list only in one node, needs a protocol mechanism to move the table to another node if the host of the table is powered down.

Node B 2 has received only positive messages from the nodes participating in the planned new connection, i. e. the planned new connection is possible for node B 2 and for node C 3. Therefore, it is possible for node B 2 to request the needed bandwidth from the resource manager 4. This is done in step A5 with the request to allocate 1260 bandwidth units. Since the bus traffic list has a momentary load of 1251 units (see FIG. 2), it is possible to allocate 1260 bandwidth units for the planned new communication of node B 2 to C 3. Therefore, the resource manager 4 sends a positive message to node B 2 in step A6.

In case only one bus traffic list is available in the network, then only the device storing the bus traffic list has to update this list, i. e. the resource manager 4 or the node B 2 would respectively be able to update the stored bus traffic lists without any additional communication. In case of the exemplary descriptive embodiment, the bus traffic list is stored in every node connected to the network, as it is shown in FIG. 2. Therefore, the bus traffic list has to be updated in every place where it is stored. This updating operation need not be performed in the same predefined order of the node numbers, as described above, since no deadlock is possible. Next, the node B 2 informs node A 1 in a step A7 that a communication of 20 Mbit/s is performed in step A8 from node B 2 to node C 3 at a speed of 100 Mbit/s, whereafter node A 1 enters to its bus traffic list in step A9 that 1260 bandwidth allocation units, corresponding to 20 Mbit/s of data, are reserved for a communication from node B 2 to node C 3 at a speed of 100 Mbit/s. In the step A11, node C 3 is informed of the new communication in the same way as node A 1, and updates its bus traffic lists as node A 1 has previously done. Node B 2 also enters this entry to its own stored bus traffic list in step A10, as the other nodes have done.

Figure 4A:
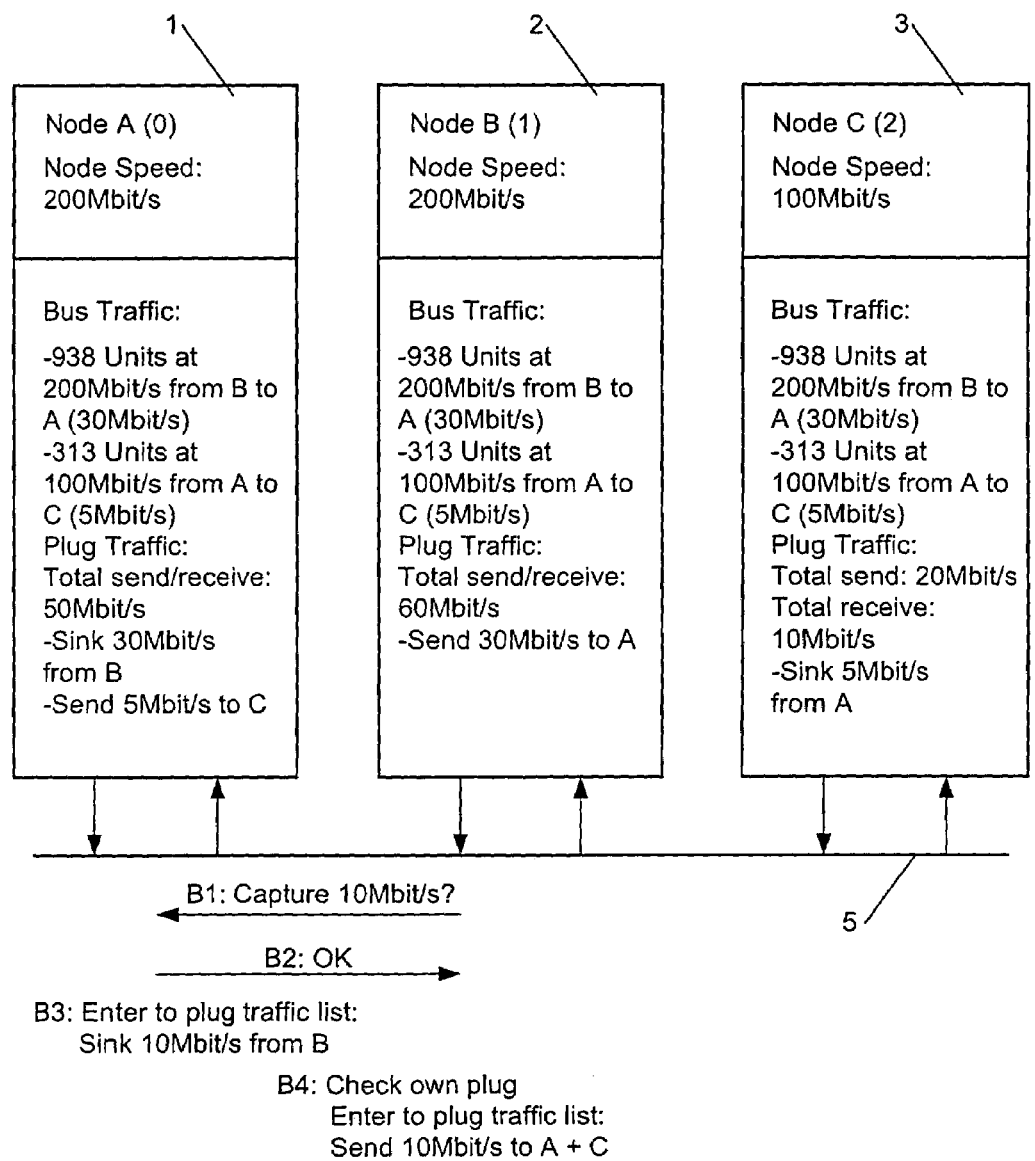
FIG. 4 is a diagram of a conflict in plug allocation while setting up a new connection, in accordance with one embodiment of the present invention.
Figure 4B:
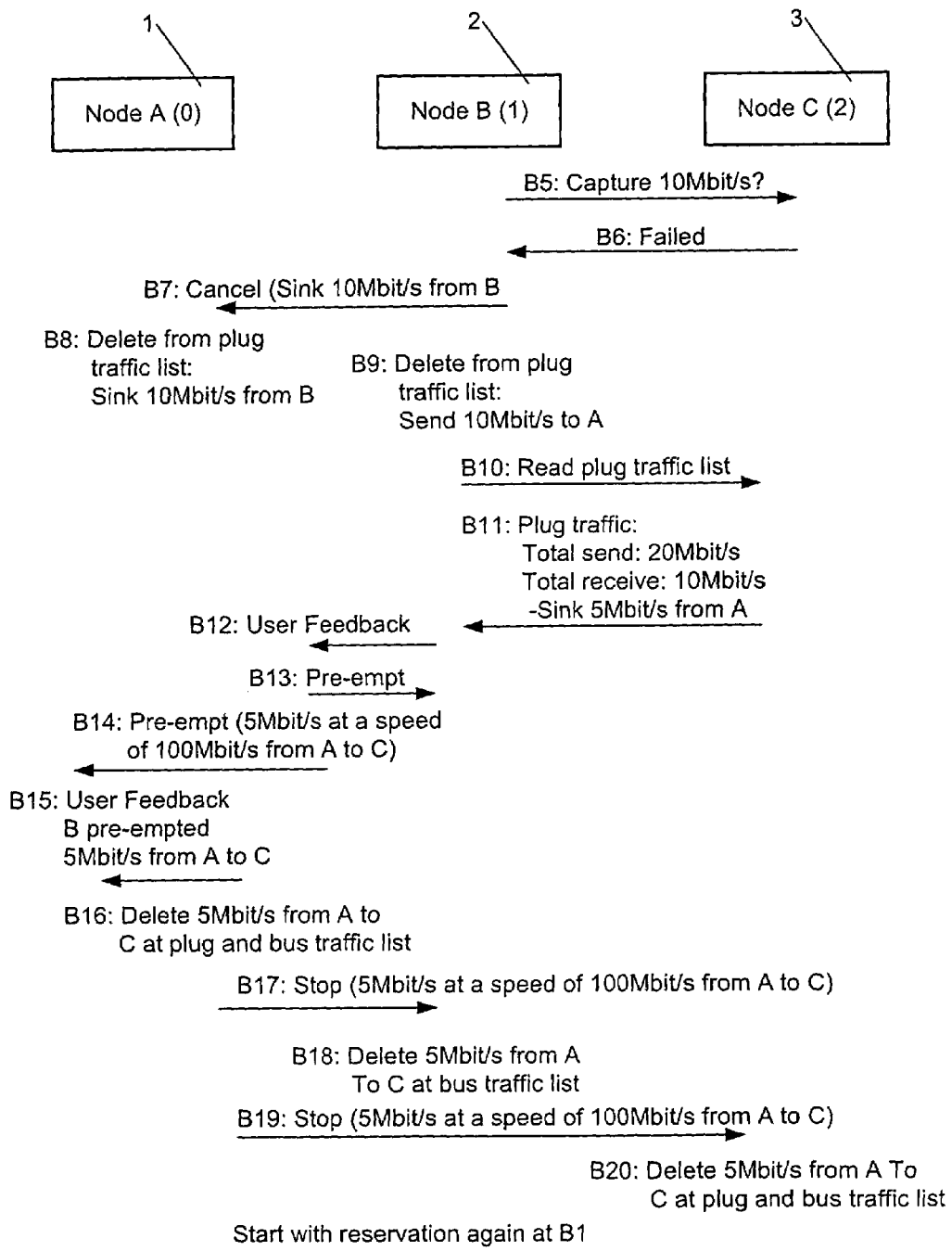

Referring now to FIG. 4, a diagram of a conflict at plug allocation while setting up a new connection is shown, in accordance with one embodiment of the present invention. In the FIG. 4 embodiment, another network is shown having a node A 1 with node number 0, a node B 2 with node number 1 and a node C 3 with node number 2 that are each connected via a bus system 5, and that function according to the present invention. Additionally, a resource manager (not shown) is also connected to said bus 5.

The node A 1 has a node speed of 200 Mbit/s, stores a bus traffic list with two entries, namely a first communication of 938 units at 200 Mbit/s from node B 2 to node A 1, i. e. a bandwidth of 30 Mbit/s, and a second communication of 313 units at 100 Mbit/s from node A 1 to node C 3, namely a communication of 5 Mbit/s, and stores its plug traffic list that shows a total send/receive capacity of 50 Mbit/s, and entries that node A 1 sinks 30 Mbit/s from node B 2 and sends 5 Mbit/s to node C 3.

Node B 2 has a node speed of 200 Mbit/s, stores the same bus traffic list as node A 1, and its plug traffic list showing a total send/receive capacity of 60 Mbit/s and an entry that node B 2 sends 30 Mbit/s to node A 1. Node C 3 works with a node speed of 100 Mbit/s, stores the same bus traffic list as nodes B 2 and A 1, and stores its plug traffic list showing a total send capacity of 20 Mbit/s, a total receive capacity of 10 Mbit/s and an entry that node C 3 receives 5 Mbit/s from node A 1.

FIG. 4 shows an example of a conflict at the plug allocation. Here, node B 2 wants to establish a new broadcast communication of 10 Mbit/s at a speed 100 Mbit/s to nodes A 1 and C 3. Since node C 3 has only a rest capacity to sink 5 Mbit/s, there will be a conflict at this node. To avoid the deadlock problem, node B 2 requests in the predetermined order of e. g. the node numbers whether the planned additional new communication will be possible for the respective nodes. In a first step B 1, a request is sent from node B 2 to node A 1 to determine if it is possible to capture a bandwidth of 10 Mbit/s. Since node A 1 has a rest capacity of 15 Mbit/s total send/receive bandwidth, a positive message can be returned to node B 2 from node A 1 in step B2, and the new communication of receiving 10 Mbit/s from node B 2 is entered to the plug traffic list of node A 1 in step B3. Then, node B 2 checks its own plug traffic as to whether this planned new communication is possible, and enters the new communication of sending 10 Mbit/s to nodes A 1 and C 3 in step B4, since it has a rest capacity of 30 Mbit/s. The last node to be requested for the available bandwidth is the node with the highest node number in this case, namely, the node C 3 that is asked by node B 2 in step B5 if 10 Mbit/s can be captured. Since node C 3 has a rest capacity of receiving 5 Mbit/s, it is not possible that it can sink another 10 Mbit/s. Therefore, it sends a negative message to node B 2 in step B6.

If the plug bandwidth reservation failed, then the former entries in the plugs that have already given a positive message have to be deleted. Since no deadlock is possible in this case, such a deletion can be done in an arbitrary order. Therefore, node B 2 informs node A 1 in step B7 to cancel the entry of sinking 10 Mbit/s from node B 2, and node A 1 deletes this entry from its plug traffic list in step B8. Then, node B 2 deletes the corresponding entry of sending 10 Mbit/s to node A 1 from its own plug traffic lists in step B9.

If such a planned new communication was instructed by a user, node B 2 generates a user feedback that should be as comprehensive as possible. If there are several possibilities to cancel another communication so that the planned new communication might be successfully installed, then all choices should be shown to the user, who then may select any other communication to be cancelled. Otherwise, if this communication was set up on its own or somehow else pre-programmed by a user, then node B 2 may decide on its own which communication should be cancelled to successful install the planned new communication with the help of priority lists or any other possible mechanism, i. e. simply to cancel the smallest other communication that allows a successful set-up of the planned new communication.

Therefore, to get all necessary information for either the user feedback or its own decision, node B 2 sends in step B10 a request to node C 3 (that has sent the negative message in step B6) to read the plug traffic list of node C 3. In step B11, node C 3 sends its plug traffic list to node B 2, including the entries of a total send capacity of 20 Mbit/s, a total receive capacity of 10 Mbit/s, and a bandwidth reservation of sinking 5 Mbit/s from node A 1. Then, node B 2 generates and displays a user feedback in step B12, and the user inputs a pre-empt instruction to node B 2 in step B13.

Based on this user feedback, node B 2 has to achieve the cancellation of the communication of 5 Mbit/s from node A 1 to node C 3. Since only a node that sends data to another node can cancel the communication, node A 1 is informed from node B 2 in step B14 that the communication of 5 Mbit/s at speed of 100 Mbit/s from node A 1 to node C 3 will be pre-empted. In step B 15, node A 1 generates a user feedback that node B 2 has pre-empted the communication of 5 Mbit/s from node A 1 to node C 3.

In step B16, node A 1 deletes the entry of the second communication, i. e. 5 Mbit/s from node A 1 to node C 3 at the bus traffic list and its plug traffic list. Then, node A 1 informs the other nodes, namely node B 2 and node C 3, that the second communication, namely the communication of 5 Mbit/s at a speed of 100 Mbit/s from node A 1 to node C 3 has been stopped in respective steps B17 and B19. In step B17, node B 2 is informed from node A 1, and therefore deletes the second communication in step B18 from its stored bus traffic list. Since node C 3 is informed from node A 1 in step B19, it responsively deletes the second communication in step B20 from its stored bus traffic list and its plug traffic list. It is self-evident that node A 1 also stops the communication of sending data with a maximal bandwidth of 5 Mbit/s to node C 3 after the pre-emption. Thereafter, node B 2 may start the reservation procedure again in foregoing step B 1.

Figure 5A:
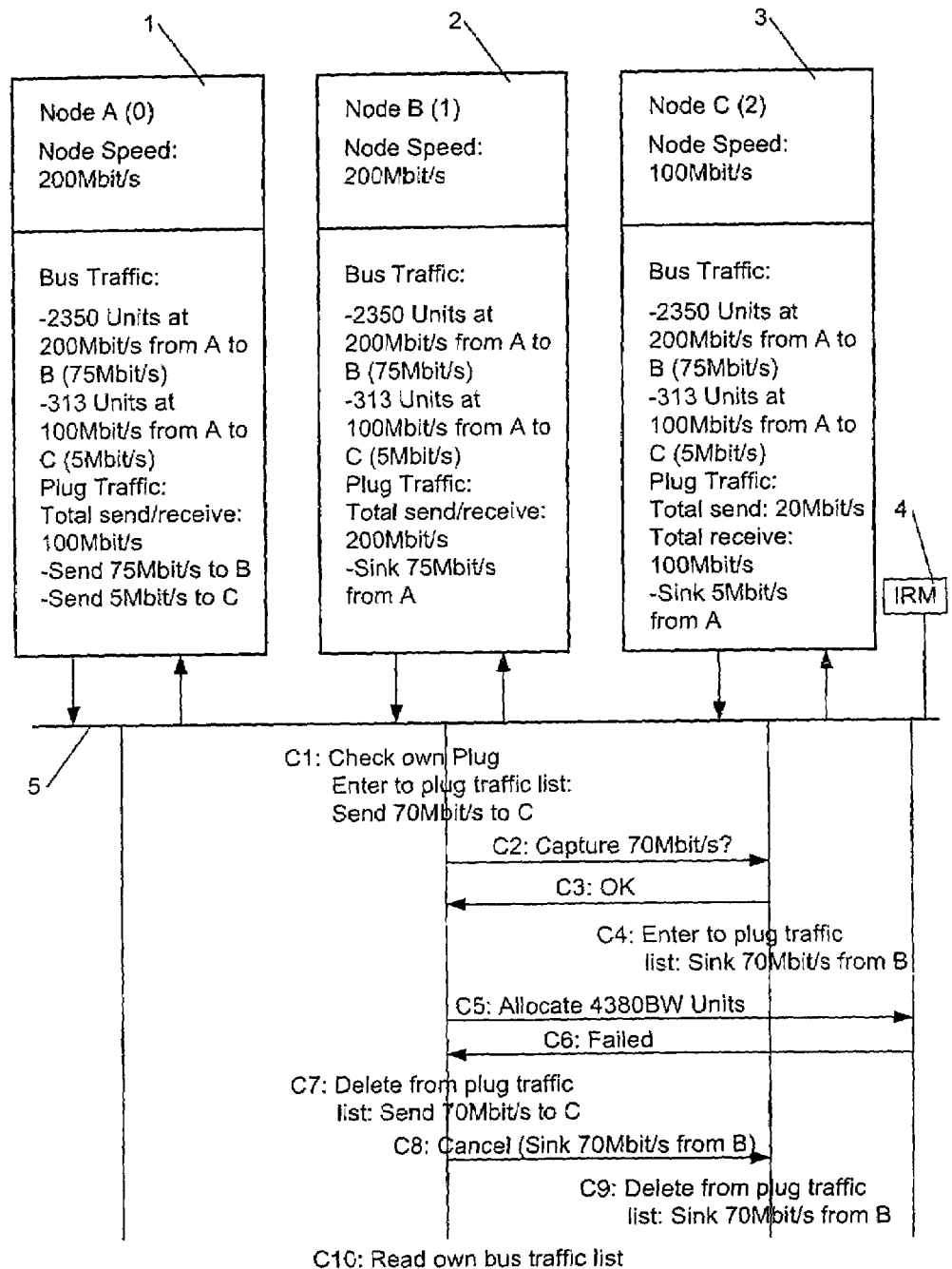
FIG. 5 is a diagram of a conflict in bus bandwidth allocation while setting up a new connection, in accordance with one embodiment of the present invention.
Figure 5B:
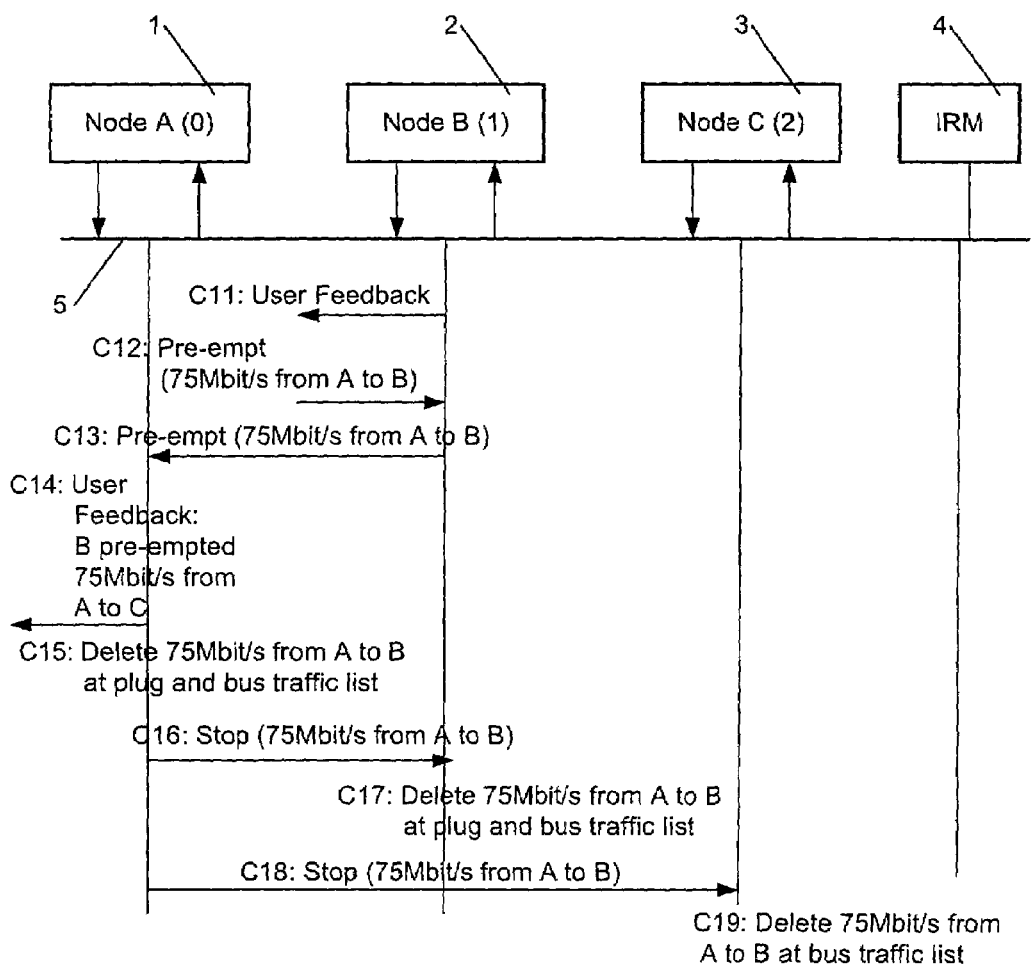
Figure 5C:
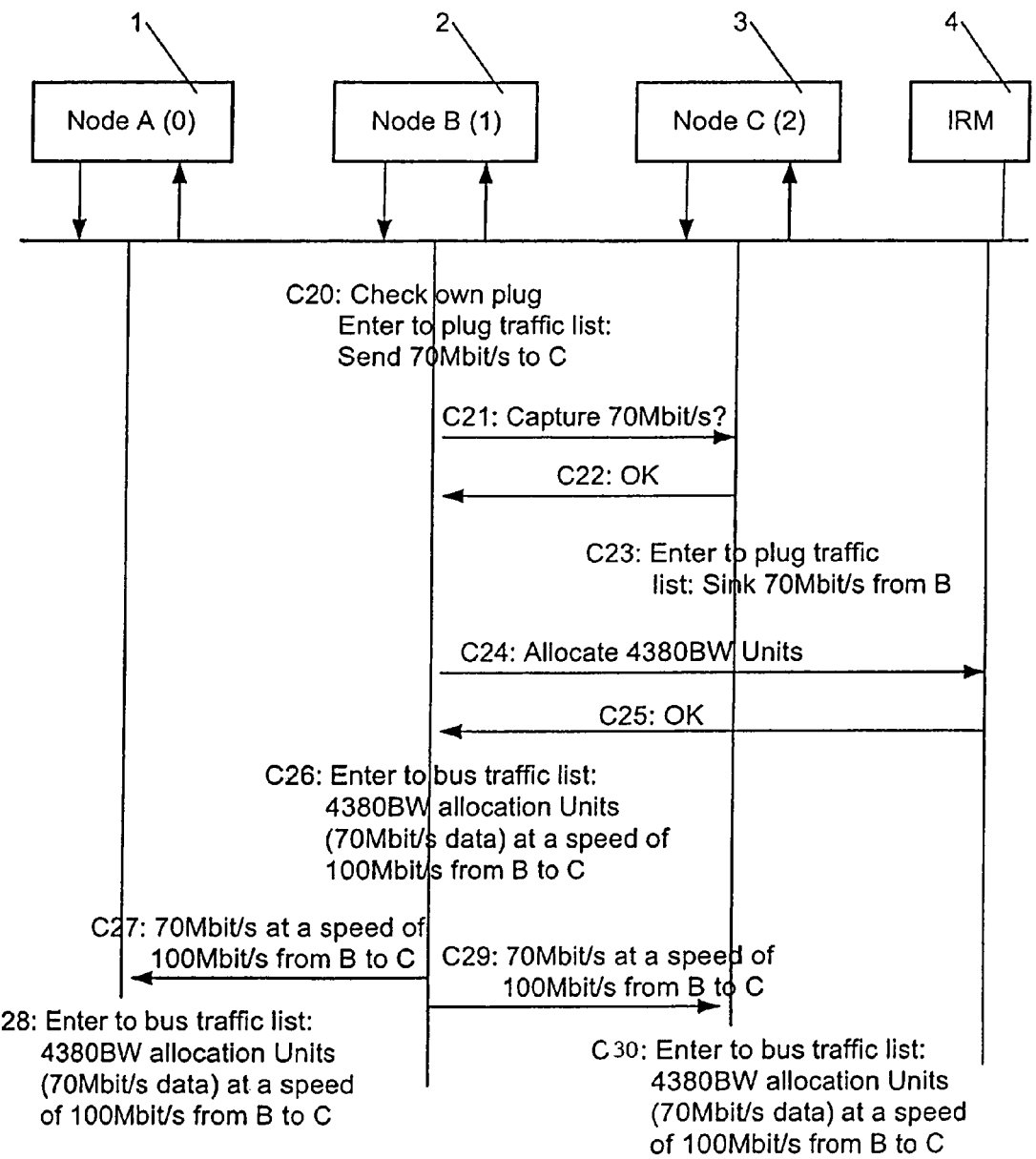

Referring now to FIG. 5, a diagram of a conflict in bus bandwidth allocation while setting up a new connection is shown, in accordance with one embodiment of the present invention. In the shown example, the network consists of three nodes 1, 2, 3 connected to a bus 5, and a resource manager 4 also connected to said bus 5. Node A 1 with the node number 0 and a node speed of 200 Mbit/s stores a bus traffic list with two entries, namely, a first communication with 2350 units at 200 Mbit/s from node A 1 to node B 2, i.e. a bandwidth of 75 Mbit/s, and a second communication with 313 units at a speed of 100 Mbit/s from node A 1 to node C 3, namely a bandwidth of 5 Mbit/s.

Furthermore, the plug traffic list of node A 1 that is also stored within the node according to this example, shows that the total send/receive capacity of node A 1 is 100 Mbit/s and that node A 1 sends 75 Mbit/s to node B 2 and 5 Mbit/s to node C 3. Node B 2, that is also connected to the bus 5, has the node number 1 and a node speed of 200 Mbit/s. It also stores the same bus traffic list as node A 1. Furthermore, the plug traffic list of node B 2 that is also stored within this node shows that node B 2 has a total send/receive capacity of 200 Mbit/s and node B2 sinks 75 Mbit/s from node A 1. Node C 3, that is also connected to the bus 5, has the node number 2 and a node speed of 100 Mbit/s. It stores the same bus traffic list as node A 1 and node B 2, and also stores a plug traffic list that shows that node C 3 has a total send capacity of 20 Mbit/s, a total receive capacity of 100 Mbit/s, and that node C 3 receives 5 Mbit/s from node A 1.

Node B 2 prepares to set up a new communication of 70 Mbit/s at a speed of 100 Mbit/s to node C 3. On the bus 5 of the network, 2663 units out of the 6250 units available in one time frame are already used. A communication of 70 Mbit/s corresponds to 4380 bandwidth units which are not fully available, since the rest capacity of the bus 5 is at most 3587 units, i.e. 6250 units minus 2663 units, from which some units have to be reserved for control commands between the nodes 1, 2, 3 and/or the recource manager 4. Therefore, as in the case described in connection with FIG. 4, there must be a function to get the needed bandwidth and to allocate it on the network.

In the example shown in FIG. 5, node B 2 first checks its own capabilities regarding the newly-planned connection according to the predetermined order, e.g. the ascending order of the node numbers, and consequently adds an entry to its plug traffic list to send 70 Mbit/s to node C 3 in a step C 1, since node B 2 has the lowest node number, i.e. 1, of all nodes that are planned to participate in the new connection. In the next step C2, node B 2 sends a request to node C 3 to capture 70 Mbit/s. Since node C 3 has a rest receive capacity of 95 Mbit/s, it sends a positive message to node B 2 in step C3, and adds an entry to its plug traffic list to sink 70 Mbit/s from node B 2 in a further step C4.

Node B 2 has only received positive messages from the nodes that are planned to participate at the new connection, namely from itself and from node C 3, and therefore node B 2 requests to allocate 4380 bandwidth units for the new connection of 70 Mbit/s at the bus 5 to the resource manager 4 in a step C5. Since only 3587 bandwidth units are available on the bus 5, as explained above, the resource manager 4 returns a negative message to node B 2 in a step C6. Therefore, node B 2 has to arrange that all entries regarding the newly planned connection are deleted from the plug traffic lists of the nodes that are planned to participate in the new connection. Therefore, node B 2 deletes the entry "send 70 Mbit/s to C" from its plug traffic list in a step C7, and sends a cancel message to node C 3 that this node should cancel its entry regarding the newly planned connection in a step C8. Therefore, node C 3 deletes the entry "sink 70 Mbit/s from node B 2" in a step C9 from its plug traffic list.

If the bandwidth reservation failed due to a negative message from the resource manager 4, e.g. the isochronous resource manager of an IEEE 1394 network system, then the former entries to bus or plug traffic lists have to be deleted as explained above. Thereafter, a user feedback should be generated that is as comprehensive as possible. If there are several possibilities for a user to cancel a communication so that the newly planned communication can be satisfactorily set up, then all choices should be shown to the user who then may make a selection.

To generate such a comprehensive user feedback, node B 2 reads its own bus 25 traffic list in a step C 10, based on which, the user feedback is generated and output in a step C11. Node B 2 can read only its own bus traffic list, since all bus traffic lists available in the network should always have the same entries. If only one bus traffic list is available in the network, then node B 2 would have to read this bus traffic list in step C10. After the user feedback in step C11, node B 2 receives a pre-emption command from the user or another device in step C12 to pre-empt the communication of 75 Mbit/s from node A 1 to node B 2.

Since the node sending the data has to cancel the data stream, node B 2 sends in a step C13 a pre-emption command to node A 1 to pre-empt the first communication, i.e. 75 Mbit/s from node A 1 to node B 2. Node A 1 generates a user feedback that the first communication was pre-empted by node B 2 in step C14, and deletes this first communication in step C15 from its plug and traffic lists. Thereafter, node A 1 distributes a message to node B 2 that node B 2 should delete the entries regarding the first communication, whereafter node B 2 deletes them from its plug and bus traffic lists in step C17. Furthermore, node A 1 communicates the message (transmitted in step C16 to node B 2) also to node C 3 in a step C18, whereafter node C 3 deletes the entry regarding the first communication from its bus traffic list is step C19. Therefore, all bus traffic lists stored in the different nodes A 1, B 2, and C 3 comprise the same entries again, and the bus now has a rest capacity of 5937 units per time frame, which means that the 4380 bandwidth units needed for the planned new communication can be allocated from node B 2 again. Also, all entries in the respective plug traffic lists regarding the pre-empted communication have been deleted, and it is self-evident that the communication itself has also been stopped.

Therefore, node B 2 checks its own capacity and enters the planned new communication "send 70 Mbit/s to node C 3" to its plug traffic list in a step C20, as in step C1 above. Thereafter, node B 2 requests to capture the bandwidth of 70 Mbit/s at node C 3 in a step C21, as in step C2 above, whereafter it receives a positive message from node C 3 in a step C22, as in step C3 above. Node C 3 then enters the corresponding entry to its plug traffic list in step C23 to sink 70 Mbit/s from node B 2, as in step C4 above.

Since node B 2 has only received positive messages from all nodes that are planned to participate in the new connection, namely from itself and from node C 3 (as previously), it requests in a step C24 to allocate 4380 bandwidth units on the bus 5 from the isochronous resource manager 4, as in step C5 above. Since now the bus 5 has enough rest capacity, the isochronous resource manager 4 replies with a positive message in step C25, whereafter node B 2 adds an entry about this new communication to its bus traffic list in step C26 that 4380 bandwidth units have been allocated at a speed of 100 Mbit/s from node B 2 to node C 3, i.e. a data rate of 70 Mbit/s. In step C27, node B 2 informs node A 1 of this communication, and node A 1 responsively updates its bus traffic list in step C28 to have the same entry as the bus traffic list of node B 2. In step C29, node B 2 informs node C 3 of this new communication, which updates its bus traffic list in step C30 to have the same entries as both other nodes.

The invention has been described in connection with the IEEE 1394 home network bus system and on IEC 61883, but it is not restricted thereto. The described methods to reserve bandwidth for a communication of at least two nodes connected to each other via a network comprising a resource manager are also applicable to networks other than home networks with consumer electronic devices. The invention is applicable to wired networks with or without additional wireless connections, and also to completely wireless networks. In case the network comprises at least one wireless connection, bandwidth is a more limited resource. Of course one embodiment according to the present invention may comprise more than one or all of the examples described above.

Control Of A Network Device In A Network Comprising Several Devices

One aspect of the present invention concerns a method to control a controllable network device with a control device in a network comprising several control devices. In particular, it concerns a strategy to allow a purposeful overtaking of the controllability of a controllable device. Generally, a network, such as a home network, comprises several devices. Such devices may include a controller to control other devices or a target device, e.g. a controllable device being controlled by a controller. It is possible that several controllers can control one target device. Existing target devices, such as e.g. tuners, are able to broadcast several programs onto the network according to the commands of several controllers.

However, it may be possible that not every combination of receivable programs can be broadcast into the network, since e.g. the tuner only has access to one satellite dish that can only be directed to one satellite resulting in a conflict if a first controller sends a command to receive a first broadcasting station transmitted via a first satellite and a second controller commands the tuner to direct its satellite dish to a second satellite and to tune its transponder to a second broadcasting station transmitted via this second satellite. In this case, conventional home networks first broadcast the program of the first broadcasting station into the network and after the command of the second controller to switch to the second broadcasting station, they follow the commands of the second controller and therefore will switch-off the broadcast of the first broadcasting station to be able to satisfy the second controller.

Therefore, one aspect of the present invention may offer a reliable method to control a controllable device with a control device in a network comprising several control devices. According to the present invention, it should be ensured that a control device accessing a controllable device, i.e. controlling this controllable device, cannot simply be overruled by another control device. The present invention includes a first control device that is able to reserve the controllable device as a primary controller so that a second control device or a further control device cannot overrule the controls of the first control device with their control commands.

According to this present invention it is not possible for a control device to influence a controllable device with its control command after another control device has reserved the controllable device. However, in a preferred embodiment of the present invention, it is possible that a reservation of a control device can be pre-empted by another control device. Pre-emption in this context means that the reservation of a control device is cancelled and the preempting control device obtains the reservation itself.

Figure 6:
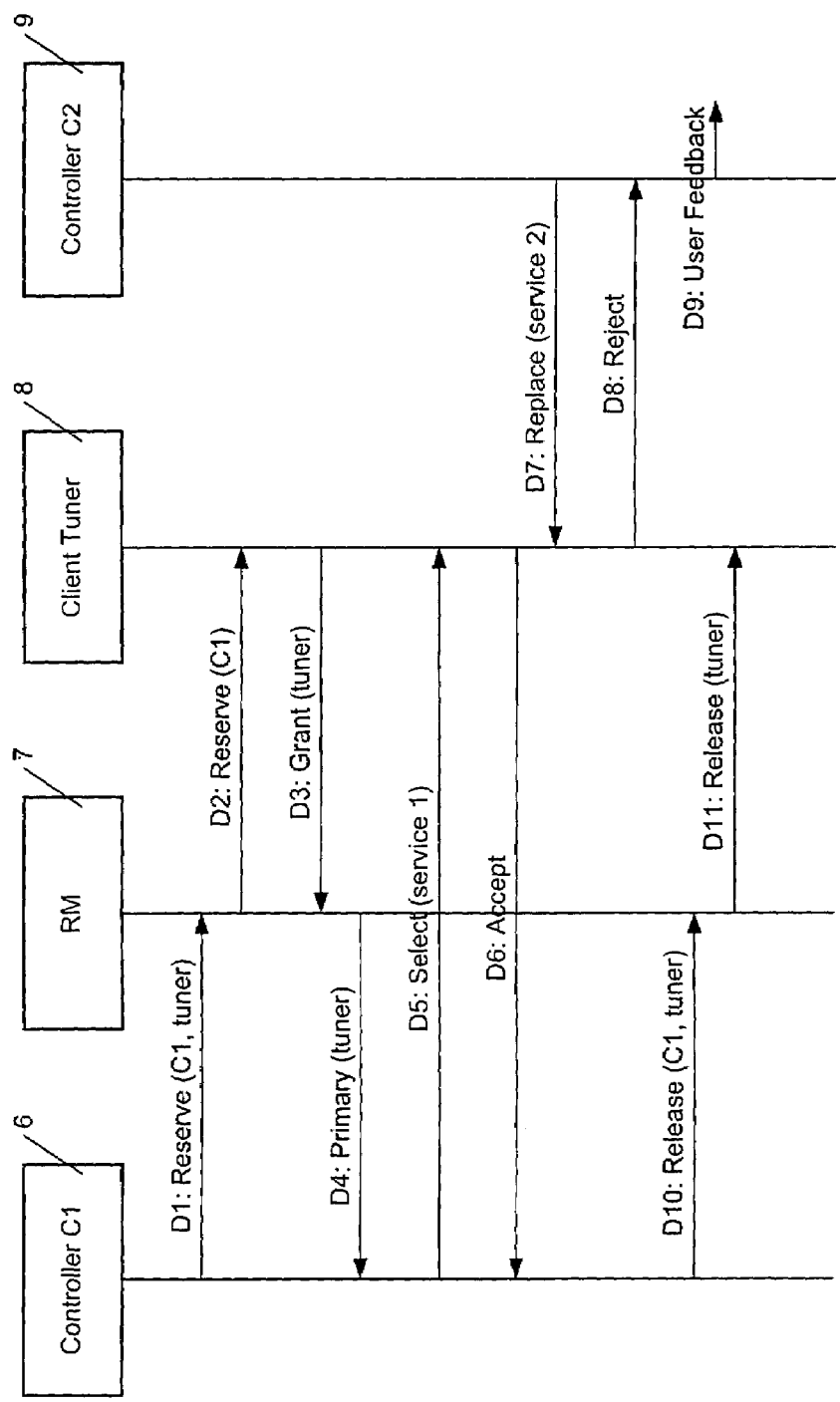
FIG. 6 is a diagram of reservation messages between software elements and the resource manager of a network, in accordance with one embodiment of the present invention.

Referring now to FIG. 6, a diagram of reservation messages between software elements and the resource manager of a network is shown, in accordance with one embodiment of the present invention. FIG. 6 shows a network comprising a first client or first controller 6, a resource manager 7, a tuner 8 that serves as a target device or network resource, and a second client or second controller 9. These devices are connected e.g. via a 1394 home network-based bus system. FIG. 6 shows that a free target device can be reserved. Furthermore, it is shown that all control commands from a controller other than the controller that has reserved the target device will be rejected. After the foregoing rejection, a user feedback is automatically generated for information purposes.

In a first step D1, the first controller 6 reserves the tuner 8 via the resource manager 7. Therefore, a reserve command is sent from the first controller 6 to the resource manager 7 that indicates that the first controller 6 wants to reserve the tuner 8. The resource manager 7 directs this reserve command in a second step D2 to the tuner 8 indicating that the first controller 6 wants to have a reservation. The tuner 8 is not reserved at the moment, and therefore is a free target device. Then, the tuner 8 grants its reservation and sends a grant message to the resource manager 7, indicating that the reserve request from the first controller 6 was successful in a third step D3. Next, the resource manager 7 indicates to the first controller 6 that the first controller 6 is now the primary controller for the tuner 8 in a step D4.

After such a reservation procedure, the first controller 6, as primary controller for the tuner 8, is able to send control commands to the tuner 8 that will be carried out by the tuner 8. As an example, it is shown that the first controller 6 sends a select command for a certain service, e.g. service 1, to the tuner 8 in a step D5. This select command is directly sent to the tuner 8, since every controller preferably sends all its control commands directly to the target device. The target device responds directly to the commanding controller, as it is shown in step D6 of FIG. 6, where the tuner 8 sends an accept message directly to the first controller 6.

Service 1, that is selected by the first controller 6, is distributed via the whole 1394 network. Therefore, other devices can access this service and display the video pictures and/or reproduce the sounds transmitted in service 1. It follows that it may be possible that another user, accessing a second controller 9, may wish to select another service instead of service 1. It is also possible that the second controller 9 may try to replace the service 1 by another service, e.g. service 2, on its own or on the basis of a pre-programmed action. FIG. 6 shows such a replace command from the second controller 9 directly sent to the tuner 8 in a step D7. This replace command indicates that the tuner 8 should switch from service 1 to service 2. Since the tuner 8 is already reserved by the first controller 6 as its primary controller, it responds to the replace command of the second controller 9 with a reject message in step D8. The second controller 9 generates a user feedback in step D9 that is either displayed directly on the second controller 9 or on any other display device in the network. Therefore, the user accessing the second controller 9 knows that the replace command from service 1 to service 2 has been rejected. It is also possible that it can be determined from the user feedback which other controller is the primary controller of the addressed device, here the first controller 6 for the tuner 8, and/or why the command has been rejected, e.g. because it is not possible for the tuner 8 to broadcast service 1 together with service 2.

In steps D10 and D11, it is shown that the first controller 6 releases the target device, i.e. the tuner 8, from being controlled by controller 6 as its primary controller. Therefore, the first controller 6 sends a release command to the resource manager 7 in step D10 to indicate that the first controller 6 will release control of the tuner 8. The resource manager 7 therefore sends a release command to the tuner 8 in step D11.

Figure 7:
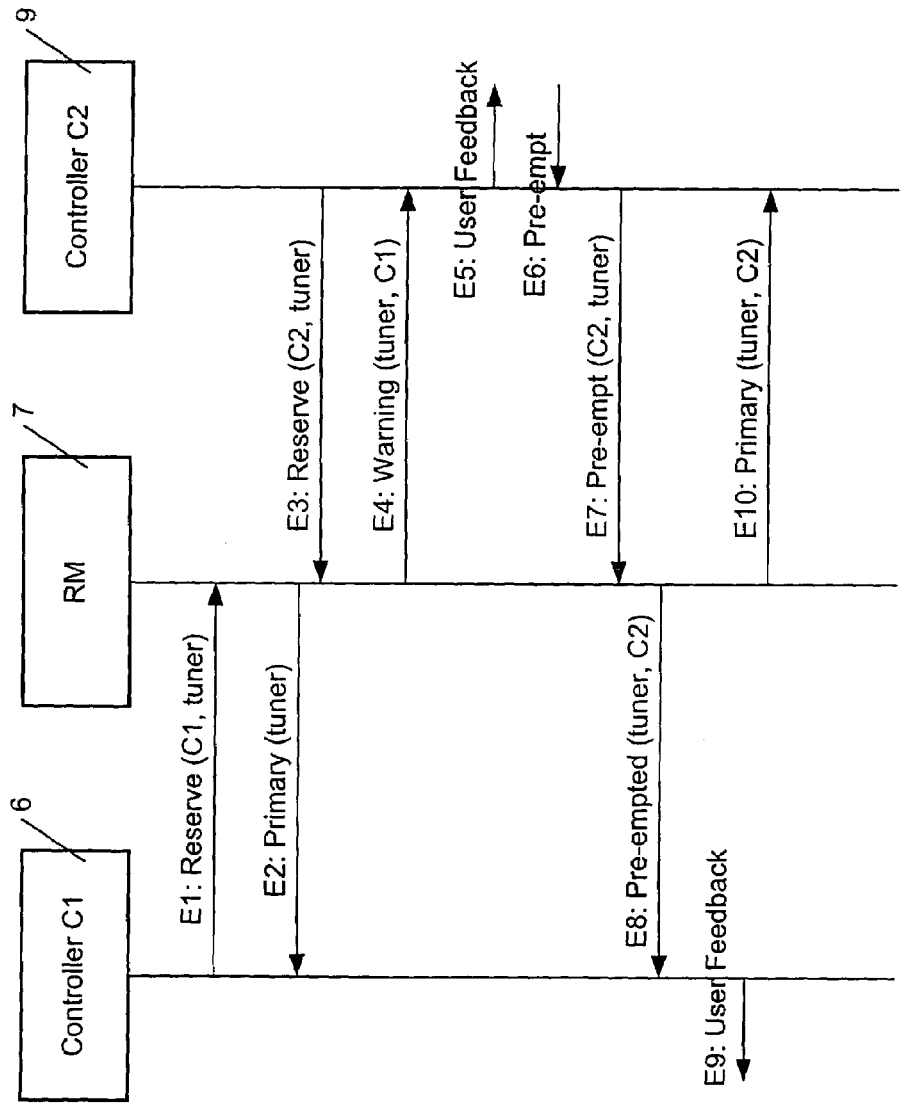
FIG. 7 is a diagram of reservation messages and pre-emption in an example with a non-shareable tuner, in accordance with one embodiment of the present invention.

Referring now to FIG. 7, a diagram of reservation messages and pre-emption in an example with a non-shareable tuner is shown, in accordance with one embodiment of the present invention. FIG. 7 shows how the second controller 9 can take the ownership of the reservation, i.e. how the second controller 9 can pre-empt the first controller 6. It is also shown that the first controller 6 receives information regarding who obtained its reservation after it was pre-empted. For simplification purposes, FIG. 7 does not show the controlled target device, i.e. the tuner 8, since all reservation and pre-emption commands preferably have to be, and are performed only via the resource manager 7.

In step E1, the first controller 6 reserves the tuner 8 via the resource manager 7, as in foregoing step D1 of FIG. 6. Therefore, the first controller 6 receives an acknowledgement that it is the primary controller of the tuner 8 in step E2, as in foregoing step D4 of FIG. 6. In step E3, the second controller 9 also tries to reserve the tuner 8, which is only able to be controlled by one device in this example, to become its primary controller. Since the tuner 8 is already reserved by the first controller 6, a warning message is sent from the resource manager 7 to the second controller 9 in a step E4 to indicate that the tuner 8 is already reserved by the first controller 6. The second controller 9 generates a user feedback in step E5 to show all relevant information to the user who is accessing the second controller 9, e.g. that the tuner 8 is already reserved by first controller 6.

In step E6, the second controller 9 gets an instruction to pre-empt from either a user or from another control system. Therefore, in step E7, the second controller 9 sends a pre-empt command to the resource manager 7 to indicate that the second controller 9 pre-empts the tuner 8. The resource manager 7 in turn generates a pre-empted message that is sent to the first controller 6 in step E8 to indicate that the tuner 8 was pre-empted by the second controller 9. In step E9, the first controller 6 generates a user feedback showing this message either on its own display or on any display device in the network. In step E10, the resource manager 7 sends a primary message to the second controller 9, indicating that the second controller 9 is now the primary controller of the tuner 8.

In a consumer electronic home network, it follows from this reservation philosophy that a user B is able to pre-empt a user A who previously reserved a target device. On the other hand, the user A may pre-empt again, or may alternatively and verbally discuss with user B regarding who should have control over a certain target device. In this way, a user would not be unable to gain access to a network device. In any case, the network device can be pre-empted by the user so that he can send his control demands to the respective target device.

If there is no user at the second controller 9 who can give the pre-emption command to said second controller 9, then it can be implementation-dependent as to how the machine shall decide. For example, if the application of the second controller 9 is e.g. a fire alarm that pre-empts a display device, then the first user will always accept a pre-emption. The first user is preferably in an informed state and can pre-empt back again, if desired. It is possible that such an automatic pre-emption is restricted to a predetermined number of times within a certain time period. In the event that one user was preempted, then the user would know from the user feedback what kind of application took over his device. So the user can stop this application locally or simply pre-empt back again later, if the application is not absolutely necessary, e.g. an internet download that could be done in the same way two hours later. The decision of whether a controller, where no user is present, shall pre-empt or not is implementation-dependent to the application running on the controller.

For example, an application sending a fire alarm will pre-empt every time, whereas, a non-time-dependent application shall not pre-empt. The manufacturer may implement a switch in a controller that runs without a user to determine whether the controller shall pre-empt or not. For example, a VCR may support such a switch for each scheduled action individually. The switch may be set by the user at the time the scheduled action is set up. If the switch is set to pre-empt, then the user will be reminded that he set up the scheduled action at the time the scheduled action starts.

Figure 8A:
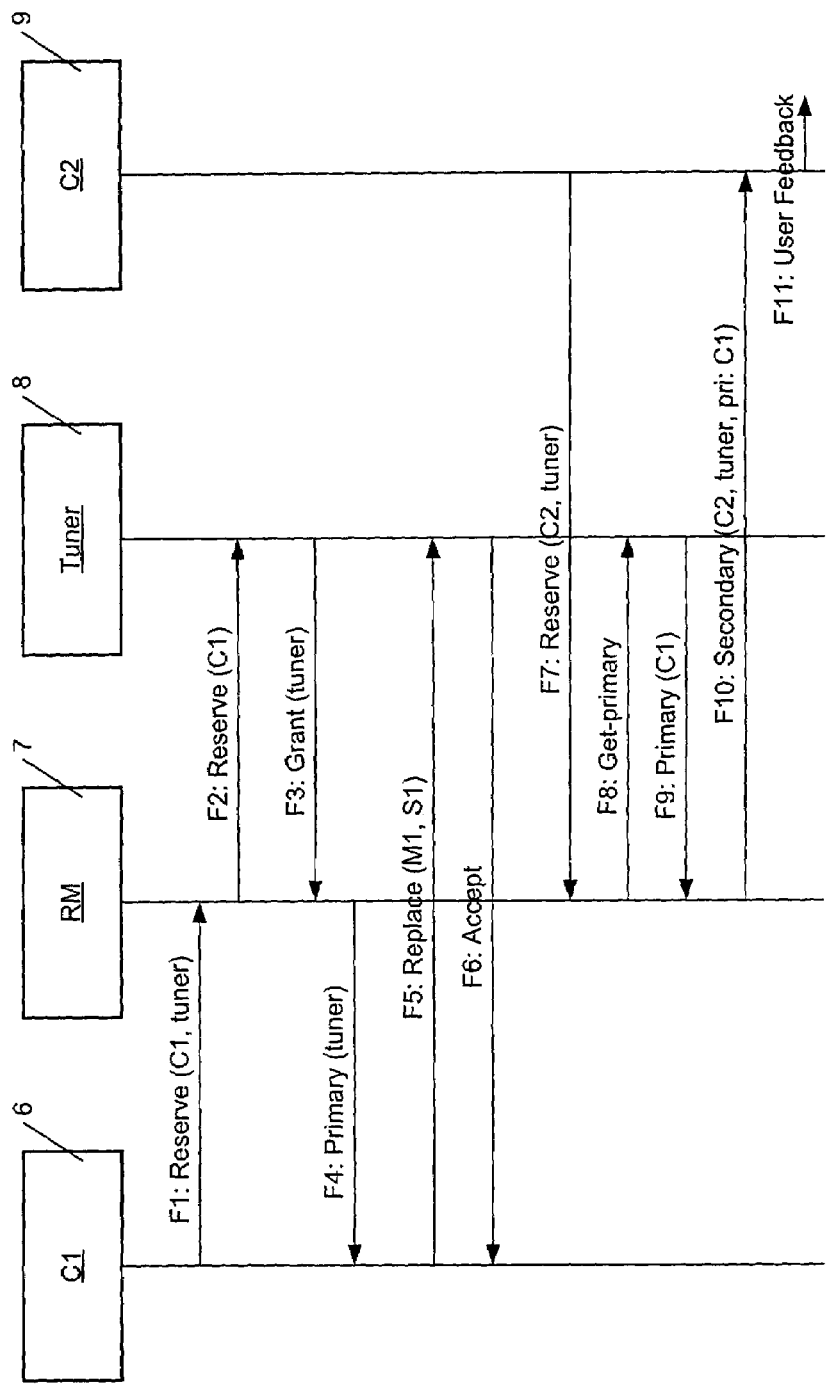
FIG. 8 is a diagram of reservation messages and pre-emption in an example with a shareable tuner, in accordance with one embodiment of the present invention.
Figure 8B:
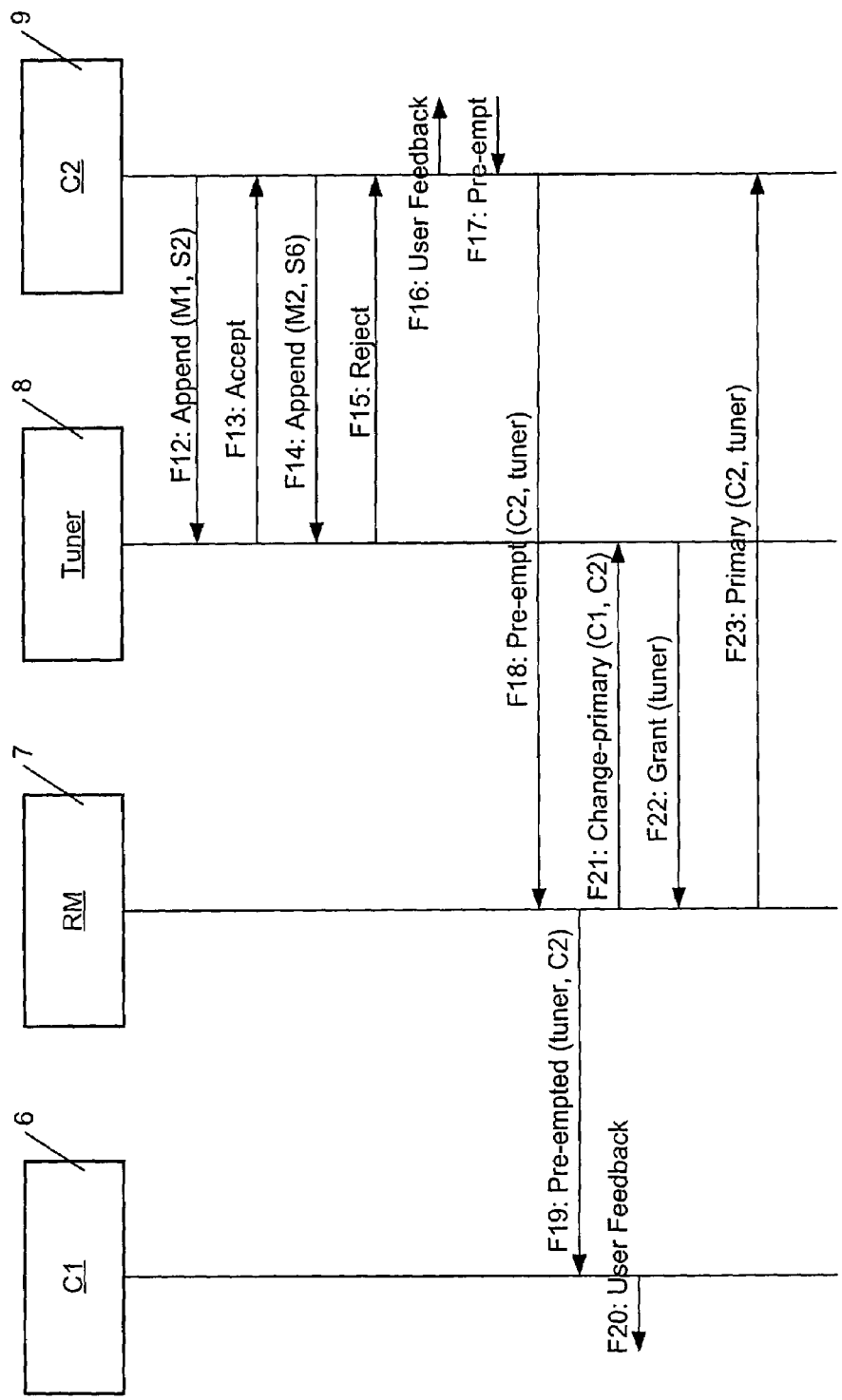

Referring now to FIG. 8, a diagram of reservation messages and pre-emption in an example with a shareable tuner is shown, in accordance with one embodiment of the present invention. FIG. 8 is divided into two parts, i.e. FIG. 8*a* and FIG. 8*b*, to show an example in which a target device is shareable and can therefore be controlled by several control devices. As mentioned above, depending on the capacity of the target device, it is not always possible to satisfy all control devices.

FIG. 8 shows again the same or similar devices as shown in FIG. 6 except for the tuner 8 that is now shareable between several controllers. Steps F1 to F4 directly correspond to steps D1 to D4 of FIG. 6. Therefore, the first controller 6 is the primary controller of the tuner 8 after its reservation. The tuner 8 can offer different services at the same time that are broadcast in the same transponder. Its limitation is that it can not offer services of different transponders at the same time.

In step F5, the first controller 6 commands to replace the currently offered program with the service 1 of transponder 1. The tuner 8 accepts and sends an accept message directly to the first controller 6 in a step F6. In step F7, the second controller 9 also directs a reserve command to the resource manager 7 to indicate that the second controller 9 wants to reserve the tuner 8. The resource manager 7 knows that there is already a reservation for the tuner 8. Resource manager 7 sends a get-primary-command to the tuner 8 in step F8 to inform itself about the primary controller of the tuner 8. The tuner 8 sends a message to the resource manager 3 in step F9 that indicates that the first controller 6 is the primary controller of the tuner 8. If the resource manager 7 is already aware of the primary controller of the tuner, then steps F8 and F9 are not necessary. In response to this message, the resource manager 7 sends a message to the second controller 9 in step F10 to indicate that the second controller 9 is the secondary controller of the tuner 8, and that the primary controller of the tuner 8 is the first controller 6. The second controller 9 gives a user feedback in step F11 showing the message just received.

As secondary controller, the second controller 9 may have limited control functions, depending on the target device, so that the secondary controller cannot overrule the primary controller. In the shown case, the second controller 9 as secondary controller cannot select another transponder for the first controller 6 as primary controller, since the tuner 8 can only offer the services of one transponder at the same time.

In step F12, the second controller 9 sends an append command to the tuner 8 that service 2 of transponder 1 should also distributed over the network. Since this is not a conflict with the possibilities of the tuner 8 in view of the commands of the primary controller, this command is accepted by the tuner 8 which in turn sends an accept message to the second controller 9 in step F13. In step F14, the second controller 9 sends another append command to the tuner 8 to indicate that the tuner 8 shall distribute service 6 of transponder 2 to the network. The limitation of a digital tuner is that only services from one transponder can be selected. One tuner may not be able to select a second service from a transponder other than the first service. Therefore, the tuner 8 rejects the append command of the second controller 9 in step F15.

Then, the second controller 9 gives a user feedback of this rejection in step F16. In step F17, the second controller 9 receives an input to pre-empt the tuner 8 to be able to control the tuner 8 to distribute service 6 of transponder 2 to the network. Therefore, the second controller 9 sends a pre-empt command to the resource manager 7 in step F18 to indicate that the second controller 9 pre-empts the tuner 8. The resource manager 7 informs the first controller 6 that it was pre-empted from being the primary controller for the tuner 8 by the second controller 9 with a pre-empted message in step F19. After reception of the pre-empted message in step F19, the first controller 6 gives a user feedback F20 showing all available information regarding the pre-emption.

In step F21, the resource manager 7 transmits a change-primary command to the tuner 8 so that the tuner 8 changes its primary controller from the first controller 6 to the second controller 9. Thereafter, the tuner 8 sends a grant message to the resource manager 7 in step F22 to indicate that the change-primary command of the resource manager 7 was successful. Therefore, in step F23, the resource manager 7 indicates to the second controller 9 that it is the primary controller of the tuner 8. After becoming the primary controller of the tuner 8, the second controller 9 is now able to select a certain service in a certain transponder as the first controller 6 previously did in step F5.

Figure 9:
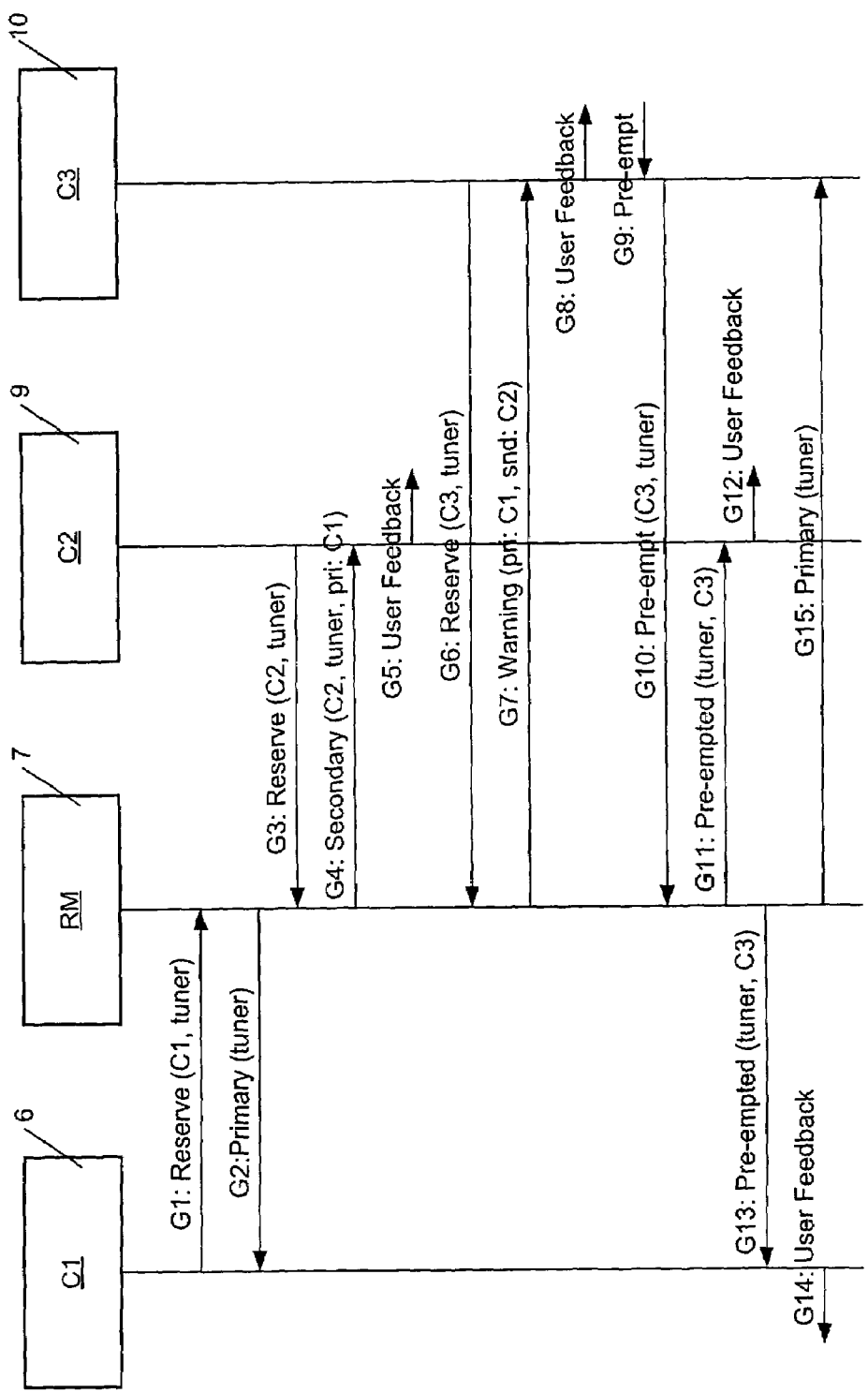
FIG. 9 is a diagram of reservation messages and pre-emption in an example with a shareable tuner with one primary controller, one secondary controller and one further controller, in accordance with one embodiment of the present invention.

Referring now to FIG. 9, a diagram of reservation messages and pre-emption in an example with a shareable tuner having one primary controller, one secondary controller and one further controller is shown, in accordance with one embodiment of the present invention. FIG. 9 shows a network as in foregoing FIG. 7, with the addition of a third controller 10. In this case, it is still possible for a tuner 8 (not shown) to have a primary controller and a secondary controller.

Steps G1 and G2 directly correspond to steps E1 and E2 shown in FIG. 7, i.e. the first controller 6 reserves the tuner 8 via the resource manager 7 in step G1, and receives the message of the tuner 8 via the resource manager 7 that the first controller 6 is the primary controller of the tuner 8 in step G2. Steps G3 to G5 directly correspond to steps F7 to F11 shown in FIG. 8a, i.e. the second controller 9 reserves the tuner 8 via the resource manager 7 in step G3, and gets back the message from the tuner 8 via the resource manager 7 that the second controller 9 is the secondary controller of the tuner 8, and, in step G4, the primary controller of the tuner 8 is the first controller 6, whereafter this message is presented as user feedback in step G5.

In step G6, the third controller 10 sends a reserve command to the tuner 8 to become its first or secondary controller. As this is not possible, in the step G7, the tuner 8 distributes a warning to the third controller 10 via the resource manager 7 that its primary controller is already the first controller 6 and its secondary controller is already the second controller 9. Then, the third controller 10 gives a user feedback showing this message in step G8. In step G9, the third controller 10 receives a pre-emption instruction, and then it sends a pre-empt command to the resource manager 7 in step G10 to indicate that third controller 10 will take over the control of the tuner 8. The resource manager 7 sends a message to the second controller 9 in step G11 that it was pre-empted by the third controller 10 in regard to the secondary control of the tuner 8, whereafter the second controller 9 presents a user feedback in step G12. The resource manager 7 also sends a message to the first controller 6 in step G13 that it was pre-empted in regard to the primary control of the tuner 8 by the third controller 10, whereafter the first controller 6 presents a user feedback in step G14 to indicate this message. Finally, the resource manager 7 sends a message to the third controller 10 that the third controller 10 is now the primary controller of the tuner 8.

It is now possible for the third controller 10 to directly and fully control the tuner 8. As can be understood from the description of these examples, it is also possible in accordance with the present invention that a first controller having a reservation for a controllable target device can be overruled by a second controller with a pre-emption command. However, in this case, the overruling is not conducted by accident or unwanted. Since a pre-emption is only performed after a reserve command or a command to the target device was unsuccessful, the pre-empting controller knows its preceding controller, and the pre-empted controller will be notified as to which controller has pre-empted it.

The present invention is not limited to the exemplary above-described 1394-based home network, and also is not limited to consumer electronic devices as target devices or control devices. It is also within the scope of the invention that various devices, e.g. various types of computer equipment, may be controlled through the use of this inventive reservation strategy.

Performing A Scheduled Action Of Network Devices

One aspect of the present invention concerns a method to perform a scheduled action of devices that are connected via a network. Usually in consumer electronics home networks, e.g. an IEEE 1394-based home network, a clock device triggers all other devices. All devices receive this trigger command at the same time and should start at the same time. Scheduled action in the context of the present invention preferably means that predetermined actions of predetermined devices are performed synchronously at a predetermined time.

Normally a network, like a home network, comprises different devices, and due to their individual constructions, every device needs a different start-up time. For example, a VCR mechanism has to move the tape into position, or a tuner has to move a satellite dish to the desired satellite and tune to the transponder. Therefore, in the conventional home network, every device will start its action at a different time, and the invoking application will thus not begin synchronously at all devices, and also not exactly at the predetermined time.

Therefore, this aspect of the present invention provides a method to perform a scheduled action of devices that are connected via a network with a synchronous start according to the invoking application. The present invention to perform a scheduled action of the devices that are connected via a network includes an individual triggering time that is calculated for every device that should perform a predetermined action at a predetermined time.

Due to the calculation of not only a single triggering time for all devices participating in the scheduled action, but of an individual triggering time for every device, all different start-up times of the individual devices may thus be taken into account, and it is possible to actually start a predetermined action of a predetermined device at a predetermined time, and not at said predetermined time plus the start-up time of the respective device.

Figure 10:
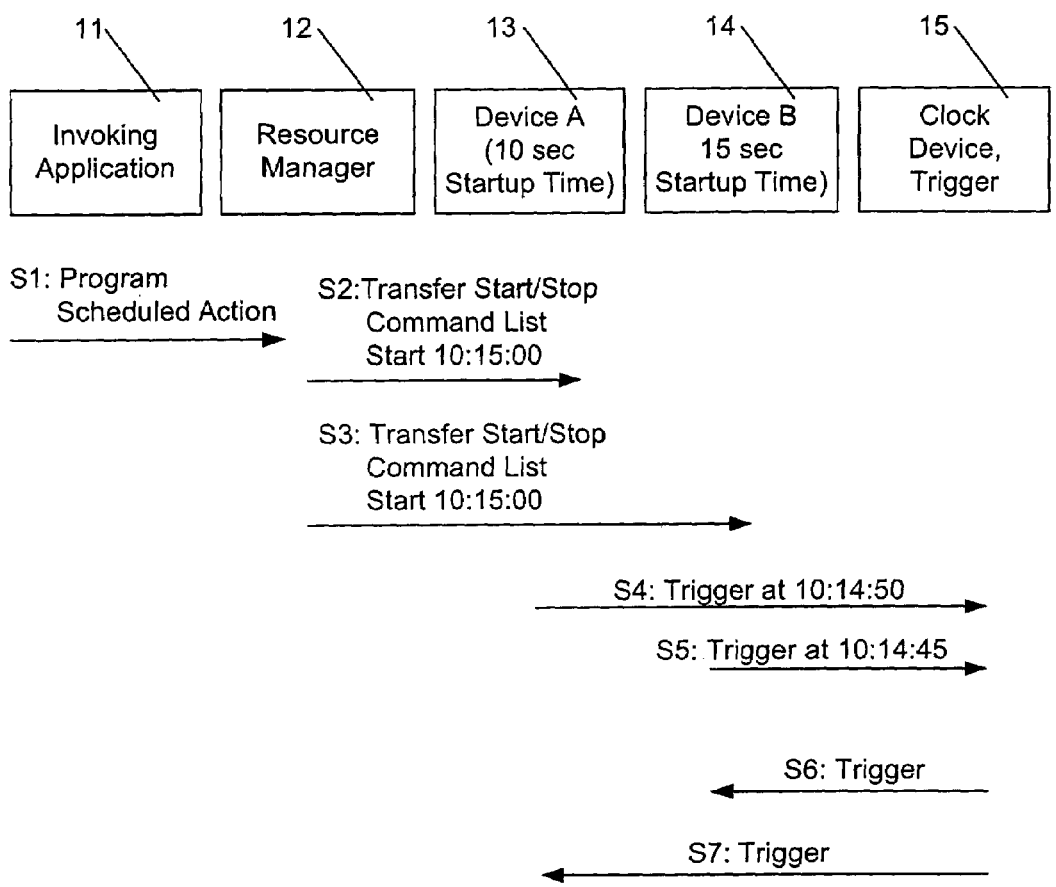
FIG. 10 is a diagram to illustrate performing a scheduled action of network devices, in accordance with one embodiment of the present invention.

Referring now to FIG. 10, a diagram to illustrate performing a scheduled action of network devices is shown, in accordance with one embodiment of the present invention. One exemplary advantageous embodiment of the present invention will be described in detail below with reference to FIG. 10 which illustrates one specific embodiment of the present invention, and shows the messages between different network devices that are exchanged according to the invention to perform a scheduled action of several devices so that the invoking application is started simultaneously at all participating devices.

In the FIG. 10 embodiment, an invoking application 11 programs the resource manager 12 which is present in the network with a scheduled action in a first step S1. Such an invoking application 11 can e.g. be based on a user command to record a predetermined program that can be received by a tuner present in the network with a VCR also present in said network. The invoking application 11 programs both the tuning of the tuner to said predetermined program at a predetermined time and the starting of the VCR-recording at said predetermined time into the resource manager 12, as well as the switching-off of the tuner and the VCR simultaneously after the program has been recorded.

In the following steps S2 and S3, the resource manager 12 transfers the respective start/stop command list and said predetermined time to the various devices that are needed for the respective programmed scheduled action. In the shown example, the start time 10:15:00 is transferred together with the individual start/stop command list to device A 13 that has a start-up time of 10 seconds in step S2, and together with the individual start/stop command list to device B 14 which has a start-up time of 15 seconds in step S3. Device A 13 can e.g. be a VCR whose mechanism needs 10 seconds to move the loaded tape into the correct position, and the device B 14 could be a tuner that needs 15 seconds to move its satellite dish to the desired satellite and to tune its transponder.

The individual start-up times are dependent on the respective devices. According to the present invention, it is also possible that one device has different start-up times for different actions to be performed. After a respective device receives the start/stop command list that describes the predetermined action to be performed, the device can look up the start-up time needed for this action in a look-up table that can be based on the worst-case start-up times of the respective device, or it can determine the start-up time on the basis of the current state of the respective device, e.g. how far a tuner has to move its satellite dish depending on the current dish position. It is also possible that the start-up time is generated from a combination of the worst-case start-up time and the current state of the respective device. The setting of too high a start-up time is not desirable, since several scheduled actions with only small time differences at one device might then more easily conflict.

When a device has received a start/stop command list and a predetermined time at which the command described in the start/stop command list should be executed or cancelled, and has generated its individual start-up time for this respective command, it then calculates an individual triggering time at which it should be triggered to have enough time to prepare itself and start exactly at the time the scheduled action should begin. Therefore, the individual start-up time is subtracted from the predetermined time of the scheduled action, and the resulting triggering time value is then transmitted to a clock device 15 of the network to serve as a trigger. In the shown example, the device A 13 transmits its individual triggering time 10:14:50 in step S4 to the clock device 15, and the device B 14 transmits its individual triggering time 10:14:45 in step S5 to the clock device 15.

Subsequently, the clock device 15 triggers the device B 14 in a step S6 at the time it has been programmed to trigger said device B 14, and in a step S7, at a time it has been programmed to trigger said device A 13. Therefore, each device A 13 and B 4 is triggered at an individual time so that it has enough time to prepare itself and start exactly at the time the respective scheduled action should start.

Of course, it is also possible that the individual triggering times are not calculated by every device A 13 or B 4 itself, but by the clock device 15 or by another control device provided for that purpose in the network. Therefore, the clock device 15 or the other control device have to know the individual start-up time of the respective devices or of the respective commands that should be executed in the respective devices, and the predetermined time that is set for the scheduled action. The functionality of the other control device can also be included in the resource manager 12. It is also possible that every device has an internal clock to trigger its device at its individual triggering time. In this case, every internal clock device has to be synchronized with the clock device 15 of the network.

As can be seen from the above exemplary embodiment of the present invention, the resource manager 12 does not directly instruct the clock device 15 by itself. Every device A 13, B 4 knows its own start-up time, e.g. the worst-case start-up time, and instructs the clock device 15 for the individual triggering command that is calculated according to the predetermined time at which the scheduled action should take place and the individual start-up time of the respective device or the respective command of the respective device. The general triggering command according to the prior art is individually preset with the start-up time of a respective device so that the device has enough time to prepare itself and start exactly at the time that the scheduled action should take place after reception of the triggering command. Such an individually preset triggering command is generated for every involved device.

The present invention is preferably executed in a home network in which it is desired by the user that various actions should take place at exactly the same time, e.g. the tuner of the home network has to receive a desired program at exactly the time the user wishes to record said program with a VCR, and where the VCR has to start its recording at exactly the same time the program begins. Preferably, such a home network is a 1394-based home network.

The various aspects of the invention have been explained above with reference to preferred embodiments. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method to control a controllable device with a control device in a network comprising several control devices, comprising:

reserving the controllable device with a first control device as a primary controller; and preventing a second control device or a further control device from overruling primary control of the first control device with secondary control commands, the second control device being able to reserve the controllable device after the reservation of the first control device as a secondary controller so that the further control device can not overrule secondary control of the second control device with further control commands, the controllable device sending a rejection to the second control device working as the secondary controller trying to overrule the first control device working as the primary controller or to the further control device trying to overrule the first control device working as the primary controller, or the second control device, working as the secondary controller, and said rejection including a list of all primary or secondary controllers, or both the primary and secondary controllers.

2. The method according to claim 1, wherein the controllable device sends the rejection directly to the control device that is rejected.

3. The method according to claim 1 or 2, wherein the second control device shows a message after the second control device has received the rejection.

4. The method according to claim 3, wherein the second control device working as the secondary controller, or the further control device is able to pre-empt the primary and/or the secondary controllers at the controllable device to become the primary controller for the controllable device.

5. The method according to claim 4, wherein the further control device can only pre-empt the first control device and/or the second control device of a certain controllable device after a user action.

6. The method according to claim 4, wherein a pre-empted first control device and/or second control device receives a message regarding which second control device or further control device has pre-empted said first control device and/or second control device.

7. The method according to claim 4, wherein the further control device can only pre-empt the first control device and/or the second control device of the certain controllable device for a predetermined number of times in a particular time period.

8. A method to control a controllable device with a control device in a network comprising several control devices, comprising:

reserving the controllable device with a first control device as a primary controller; and preventing a second control device or a further control device from overruling primary control of the first control device with secondary control commands, the first control device being able to reserve the controllable device or pre-empt another control device, via a resource manager included in the network.

9. A system for managing device control in an electronic network, comprising:

an electronic device, coupled to said electronic network, to perform specified functions;

a first controller, coupled to said electronic network, to establish a primary control over said electronic device;

a second controller, coupled to said electronic network, to seek said primary control over said electronic device; and a resource manager configured to arbitrate between said first controller and said second controller for controlling access to said primary control over said electronic device.

10. The system of claim 9 wherein said resource manager grants said second controller a secondary control over said electronic device.

11. The system of claim 10 wherein said first controller and said second controller communicate directly with said electronic device during said primary control and said secondary control.

12. The system of claim 9 wherein said second controller utilizes said resource manager to pre-empt said first controller and thereby gains said primary control over said electronic device.

13. The system of claim 9 wherein said network functions in accordance with a home audio-video interoperability specification.

14. A system for managing resources in an electronic network, comprising:

a network resource, coupled to said electronic network, to perform specified functions;

a first client, coupled to said electronic network, to request a primary control over said network resource;

a resource manager configured to reserve said primary control over said network resource for said first client; and a second client coupled to said electronic network to seek said primary control over said network resource, said resource manager negotiating between said first client and said second client to obtain said primary control over said network resource.

15. The system of claim 14 wherein said resource manager initially attempts a non-intrusive reservation of said primary control of said network resource.

16. The system of claim 15 wherein said second client makes a pre-emption attempt to gain said primary control when said non-intrusive reservation is unsuccessful.

17. The system of claim 16 wherein a pre-emption attempt result for said pre-emption attempt is determined based on a respective resource role categorization for said first client and said second client.

18. A system for managing resources in an electronic network, comprising:

a network resource, coupled to said electronic network, to perform specified functions;

a first client, coupled to said electronic network, to request a primary control over said network resource;

a resource manager configured to reserve said primary control over said network resource for said first client; and a second client coupled to said electronic network seek said primary control over said network resource, said resource manager negotiating between said first client and said second client to obtain said primary control over said network resource, said network resource being shared by a primary access for full control of said network resource and a secondary access for limited control of said network resource.

* * * * *